(12) United States Patent
Takahashi et al.

(10) Patent No.: US 12,026,316 B2
(45) Date of Patent: Jul. 2, 2024

(54) TACTILE FEEDBACK APPARATUS

(71) Applicants: Yuki Takahashi, Tokyo (JP); Yasutaka Kitamura, Tokyo (JP); Takahiko Irie, Tokyo (JP); Tomoya Ishitani, Tokyo (JP)

(72) Inventors: Yuki Takahashi, Tokyo (JP); Yasutaka Kitamura, Tokyo (JP); Takahiko Irie, Tokyo (JP); Tomoya Ishitani, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/250,785

(22) PCT Filed: Oct. 28, 2021

(86) PCT No.: PCT/JP2021/039773
§ 371 (c)(1),
(2) Date: Apr. 27, 2023

(87) PCT Pub. No.: WO2022/092184
PCT Pub. Date: May 5, 2022

(65) Prior Publication Data
US 2023/0400925 A1 Dec. 14, 2023

(30) Foreign Application Priority Data
Oct. 30, 2020 (JP) .................. 2020-182578

(51) Int. Cl.
*G06F 3/01* (2006.01)
(52) U.S. Cl.
CPC .................. *G06F 3/016* (2013.01)

(58) Field of Classification Search
CPC ....... G06F 3/016; G06F 3/041; G06F 3/03547
See application file for complete search history.

(56) References Cited

U.S. PATENT DOCUMENTS

2013/0222126 A1  8/2013  Aono
2015/0077360 A1  3/2015  Hirano
(Continued)

FOREIGN PATENT DOCUMENTS

JP         5173044 B1    3/2013
JP       2015-070729 A   4/2015
(Continued)

OTHER PUBLICATIONS

International Search Report from International Application No. PCT/JP2021/039773 dated Jan. 25, 2022.

*Primary Examiner* — Abbas I Abdulselam
(74) *Attorney, Agent, or Firm* — Shih IP Law Group, PLLC.

(57) ABSTRACT

The present invention provides a tactile feedback device that detects a user operation based on touch without erroneous detection, providing stable tactile feedback. This device includes: an operated section that receives a user operation based on touch; a touch detection section for detecting touch on the operated section; a load detection section that detects a load on the operated section due to touch; a vibration actuator that generates vibration and outputs the vibration to the operated section; and a driving control section that drives, in response to the detection of touch and detection of load, the vibration actuator to vibrate the operated section, feeding back tactile sensation to a user, wherein the load detection section stops detection of a load during vibration.

18 Claims, 27 Drawing Sheets

(56) References Cited

U.S. PATENT DOCUMENTS

2015/0169061 A1 6/2015 Odajima
2021/0055810 A1* 2/2021 Wakuda .............. G06F 3/03547

FOREIGN PATENT DOCUMENTS

| JP | 2019-028624 A | 2/2019 |
| JP | 2020-123205 A | 8/2020 |
| JP | 2020-177440 A | 10/2020 |
| WO | 2012063497 A1 | 5/2012 |

* cited by examiner

TACTILE FEEDBACK APPARATUS

TECHNICAL FIELD

The present invention relates to a tactile feedback apparatus.

BACKGROUND ART

In the related art, a configuration is known in which when operating a touch panel, which is sensing panel, a vibration from a vibration actuator as a sense of contact operation (a sensation of operating by contact) is provided to the user's finger belly or the like touching the display screen displayed on the touch panel, is known (see PTL 1).

PTL 1 discloses a mobile terminal apparatus in which a vibration actuator is attached to the rear surface of a touch panel through a vibration transmission part. In this vibration actuator, a guide shaft extending in the direction perpendicular to the touch panel is provided in a housing fixed to the vibration transmission part, and a movable member can move back and forth along the extending direction of the guide shaft. In this vibration actuator, the movable member is brought into contact with the housing in a manner corresponding to the operation on the touch panel, and thus a vibration is provided to the finger belly touching the panel through the vibration transmission part.

CITATION LIST

Patent Literature

PTL 1
Japanese Patent Application Laid-Open No. 2015-070729

SUMMARY OF INVENTION

Technical Problem

Incidentally, it is known that in the configuration of providing a vibration as a tactile sensation to the user's finger belly through the touch panel in a manner corresponding to the user operation on the touch panel, the contact on the touch panel and the load exerted on the touch panel are detected and the corresponding vibration is provided to the user through the touch panel.

However, in this configuration, when the user operation is detected and a vibration is provided to the touch panel, the load onto the touch panel due to the vibration may possibly be erroneously detected as the user operation. In view of this, there has been a desire to stably feedback the operation when the vibration is fed back as a tactile sensation.

An object of the present invention is to provide a tactile feedback apparatus with which the contacting operation of the user can be detected without causing erroneous detection, and a stable tactile feedback can be provided.

Solution to Problem

A tactile feedback apparatus of the present invention includes: an operated part configured to receive a user operation using a contact; a contact detection part configured to detect the contact on the operated part; a load detection part configured to detect a load of the contact on the operated part; a vibration actuator configured to generate a vibration and output the vibration to the operated part; and a drive control part configured to vibrate the operated part by driving the vibration actuator in accordance with a detection of the contact and a detection of the load, and feed back a tactile sensation to the user. The load detection part stops the detection of the load during the vibration.

Advantageous Effects of Invention

According to the present invention, the contacting operation of the user can be detected without causing erroneous detection, and a stable tactile feedback can be provided.

DESCRIPTION OF EMBODIMENTS

An embodiment of the present invention is elaborated below with reference to the accompanying drawings.

Figure 1:
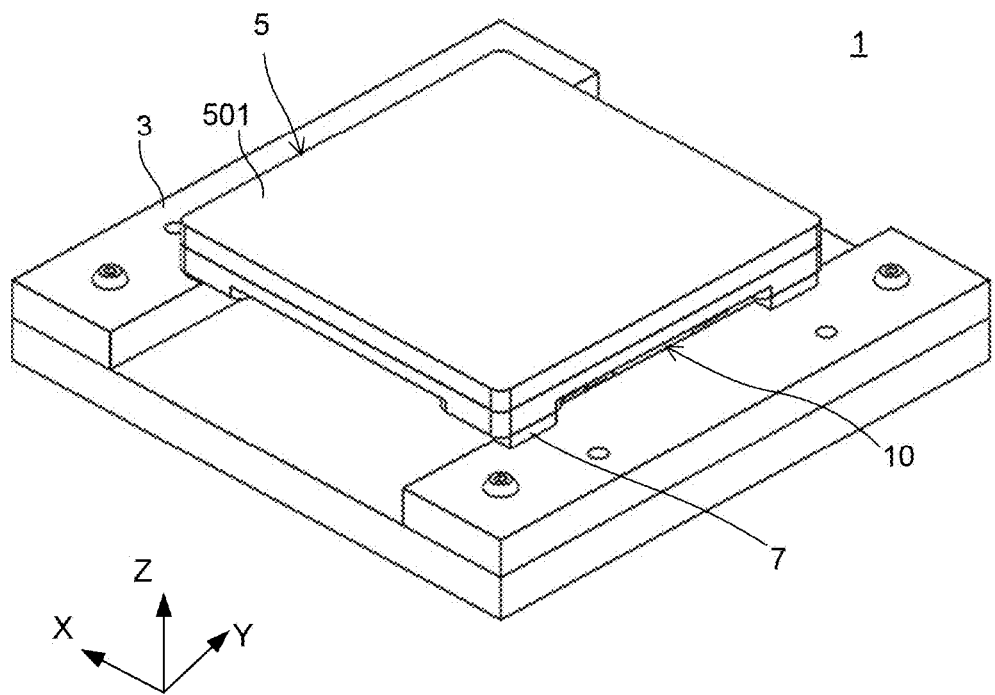
FIG. 1 is a perspective view illustrating an external appearance of a tactile feedback apparatus according to the embodiment of the present invention.
Figure 2:
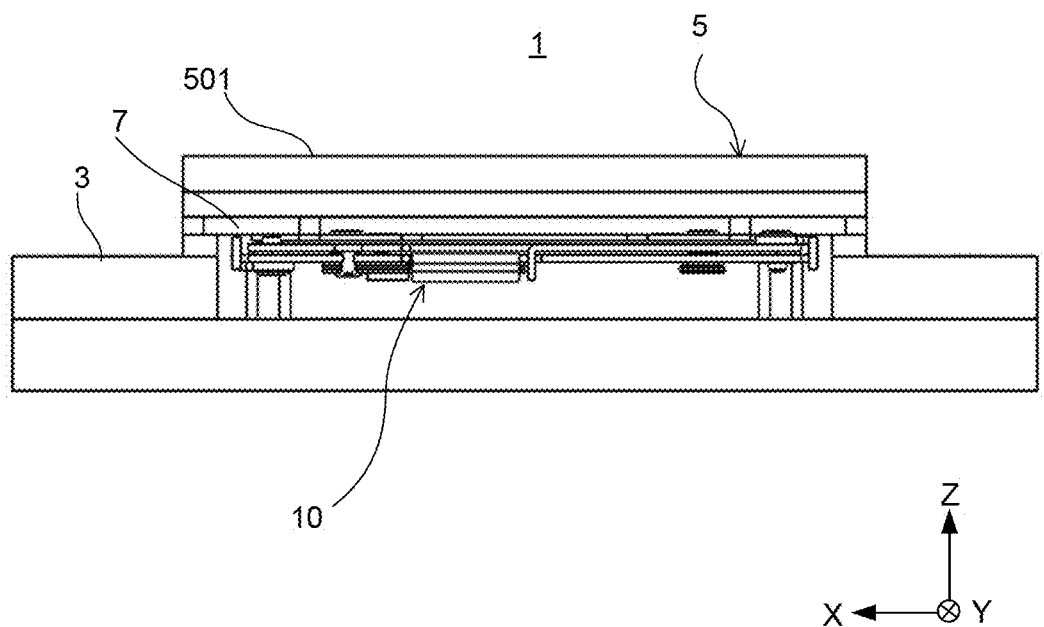
FIG. 2 is a front view of the tactile feedback apparatus according to the embodiment of the present invention.
Figure 3:
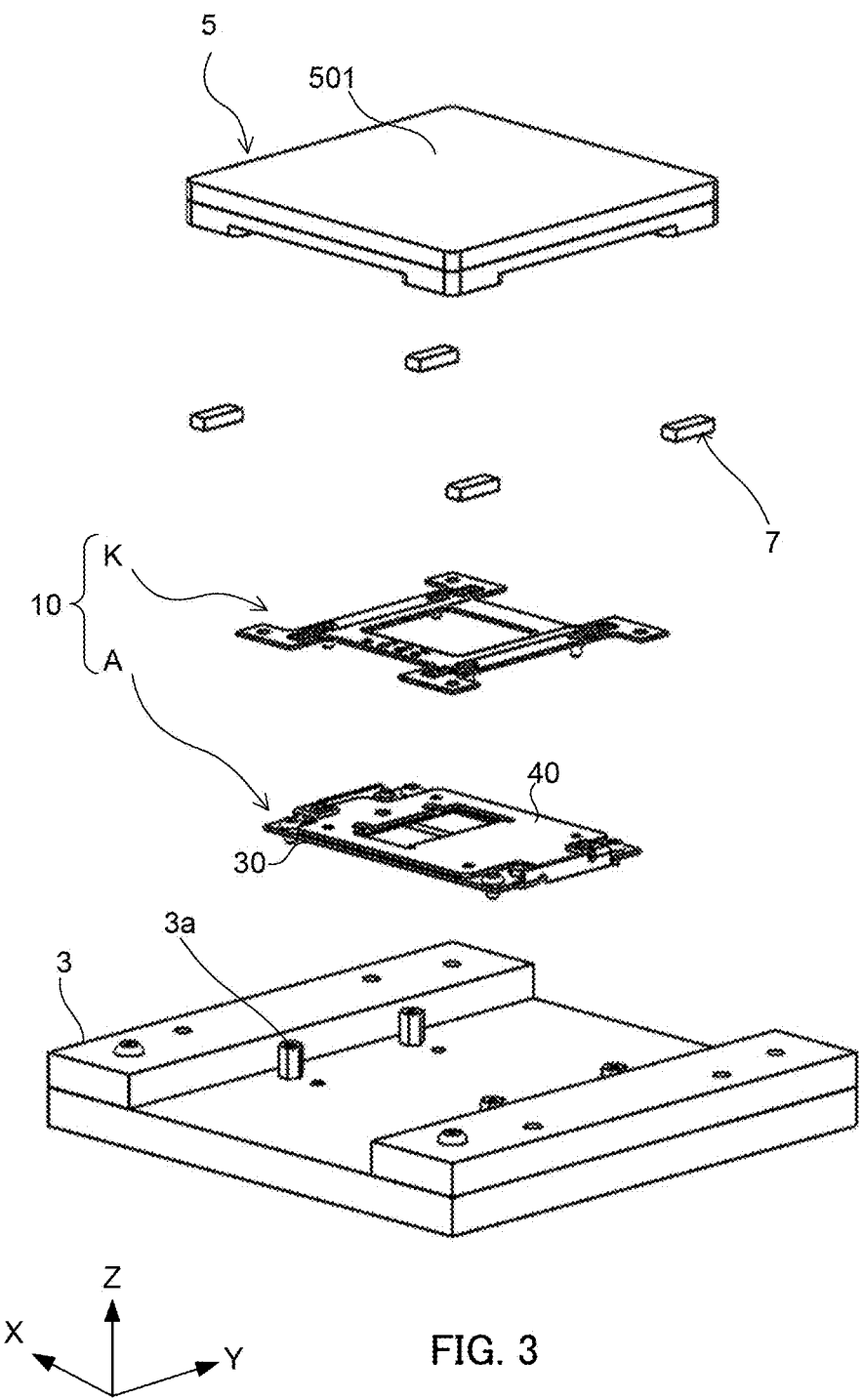
FIG. 3 is an exploded perspective view of the tactile feedback apparatus according to the embodiment of the present invention.
Figure 4:
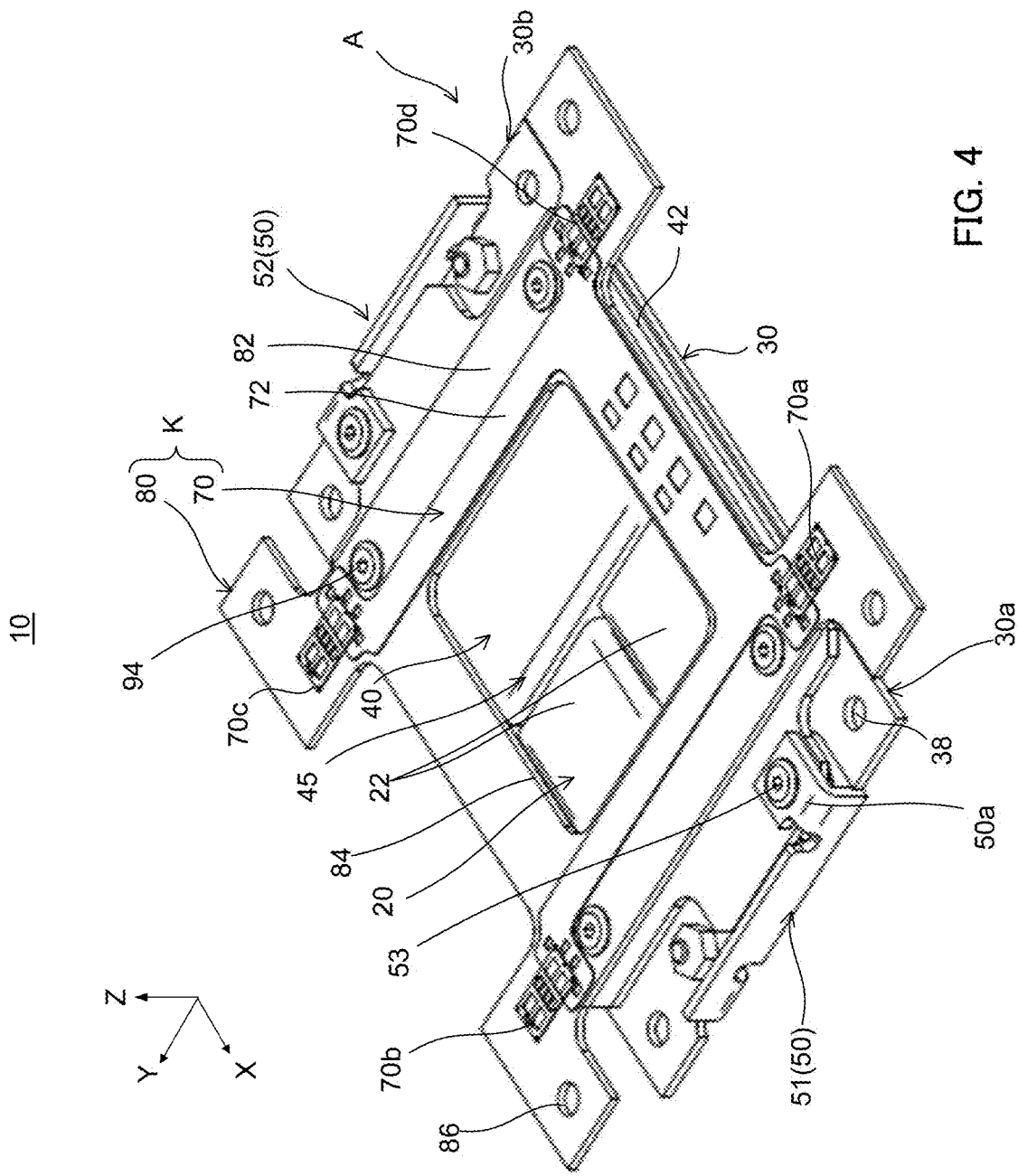
FIG. 4 is a perspective view illustrating an external appearance of a vibration actuator of the tactile feedback apparatus according to the embodiment of the present invention.
Figure 5:
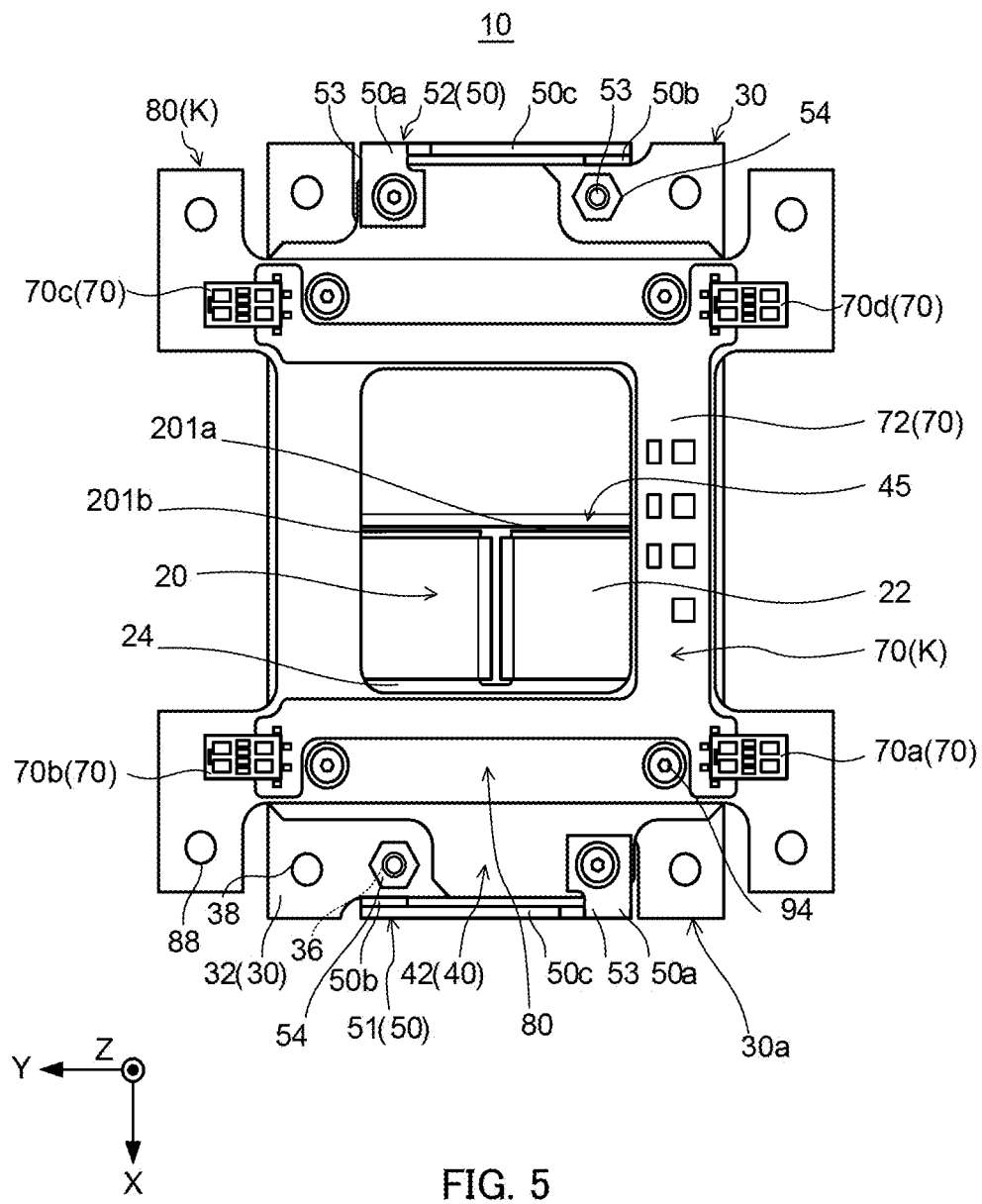
FIG. 5 is a plan view of the vibration actuator.
Figure 6:
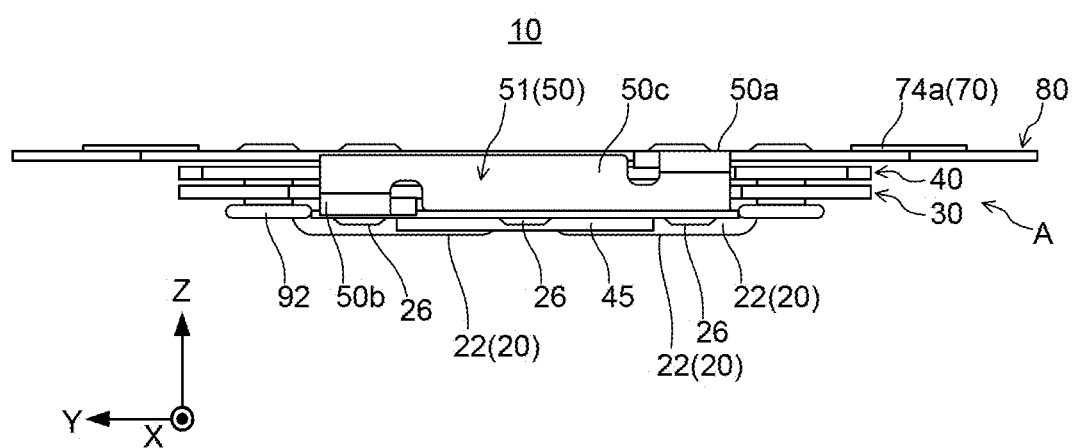
FIG. 6 is a front view of the vibration actuator.
Figure 7:
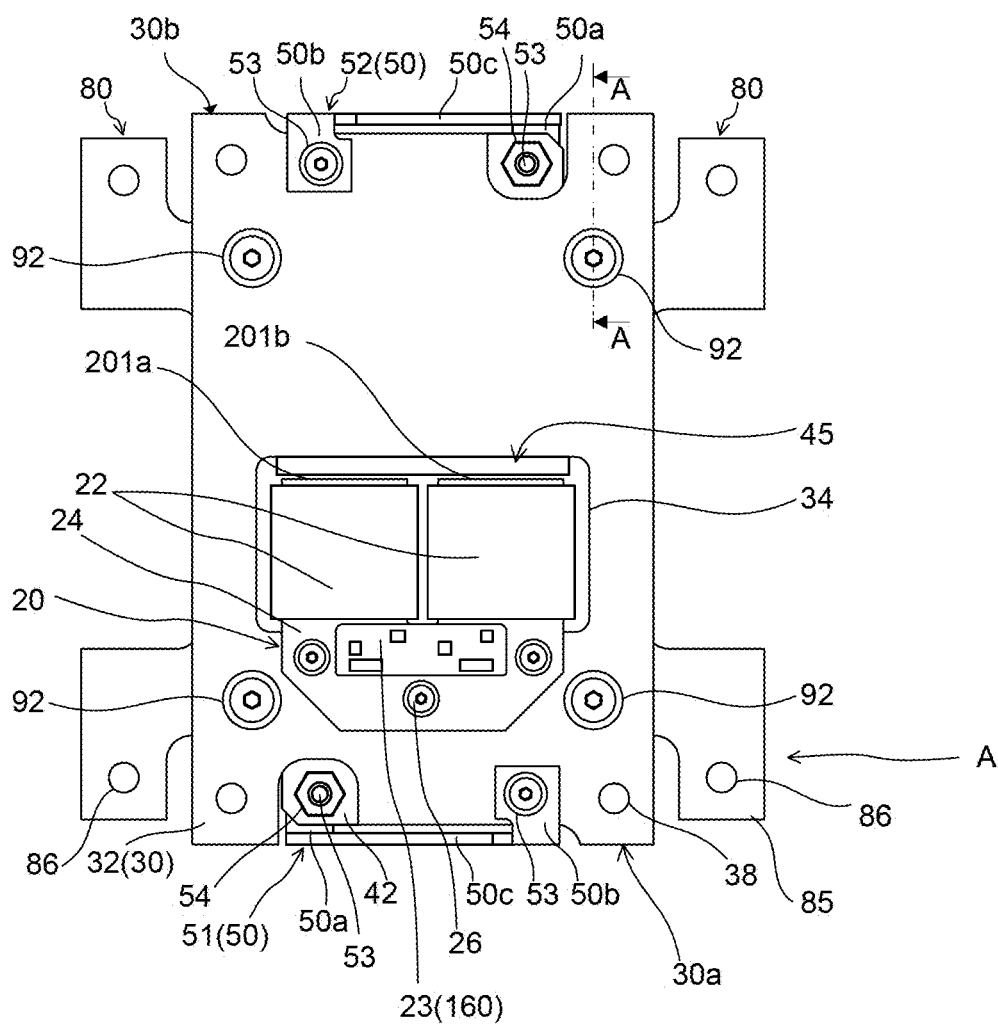
FIG. 7 is a bottom view of the vibration actuator.

FIG. 1 is a perspective view illustrating an example of an external appearance of a tactile feedback apparatus according to the embodiment of the present invention, and FIG. 2 is a front view of the tactile feedback apparatus according to the embodiment of the present invention. In addition, FIG. 3 is an exploded perspective view illustrating a configuration of a main part of the tactile feedback apparatus according to the embodiment of the present invention.

In the present embodiment, an orthogonal coordinate system (X, Y, Z) is used for description. In the drawings described later, the common orthogonal coordinate system (X, Y, Z) is used. In the following description, the depth, width and height of tactile feedback apparatus 1 and vibration actuator 10 are set as the lengths in the X direction, Y direction, and the Z direction, respectively. Specifically, for convenience of the description, vibration actuator is described with the X direction (also referred to as the plus X direction) set as the end side (one end side), the –X direction (also referred to as the minus X direction) as the base end side (other end side), and the X direction and –X direction as the front-rear direction.

General Configuration of Tactile Feedback Apparatus 1

Tactile feedback apparatus 1 illustrated in FIG. 1 includes operated part 501 for receiving the contacting operation of the user, receives the user operation at operated part 501, and vibrates operated part 501 in accordance with the user operation. In this manner, tactile feedback apparatus 1 gives (feeds back) the user the vibration as a sense of contact operation (also called "tactile sensation" or "sense of force").

Tactile feedback apparatus 1 includes operated part 501, base part 3, and vibration actuator 10 connected to both operated part 501 and base part 3. Vibration actuator 10 places operated part 501 to base part 3 in a movable manner.

Preferably, operated part 501 is provided to an operation apparatus configured to be contacted and operated by the user and the like. Examples of the operation apparatus and the like include touch panel 5 that functions as a tactile feel presentation part for providing the user with the vibration given by vibration actuator 10, as a tactile feel. Operated part 501 may make up the front surface touch panel 5. Operated part 501 moves along with the movement of touch panel 5. In this case, touch panel 5 is provided with electrostatic sensor 6 or a resistive film sensor making up a part of a contact detection part that detects the contact operation of the user, and the like.

As illustrated in FIG. 3, in tactile feedback apparatus 1, vibration actuator 10 is configured by load detection module K attached to actuator body A, for example. Actuator body A includes fixing body 30 fixed to base part 3 and movable member 40 directly connected to the operated part. Movable member 40 vibrates with respect to fixing body 30 through electromagnetic interaction.

As illustrated in FIG. 3, movable member 40 is configured to move back and forth in the plus minus X direction with respect to fixing body 30 fixed to base part 3, and provide a vibration in the plus minus X direction as a vibration of a tactile feel when a finger or the like touches operated part 501.

When a vibration is transmitted to the user through operated part 501 and the user feels it, the user who operated the operated part 501, i.e., the user who touched the operated part 501 can perform intuitive operation. Operated part 501, or more specifically, touch panel 5, includes attenuation part 7 that attenuates a vibration.

Attenuation part 7 is each sandwiched between operated part 501 and base part 3 to which vibration actuator 10 fixed in a drivable manner. Attenuation part 7 can attenuate the vibration of touch panel 5 and reduce collision during the movement with respect to base part 3 of touch panel 5.

Attenuation part 7 is provided at the four corners of touch panel 5. In tactile feedback apparatus 1, with the structure of touch panel 5, attenuation part 7 can be disposed on both sides of touch panel 5 by disposing vibration actuator 10 at the center of base part 3. Preferably, attenuation parts 7 are disposed at a plurality of positions in a symmetric manner about the center of the surface of operated part 501 for receiving the user operation. In this manner, touch panel 5 can equally receive the load, especially the load that is received from the direction perpendicular to the front surface as the contact surface, with a good balance, and thus can achieve stable operation and load detection. Attenuation part 7 may be preloaded.

Attenuation part 7 is not limited as long as the vibration can be attenuated, and may be composed of thermoplastic elastomer, or more specifically, heat curable silicone rubber or thermoplastic butyl rubber. With a structure using elastomer such as silicone rubber and butyl rubber for stopping, i.e., attenuating the vibration of operated part 501 in a certain time, attenuation part 7 can feedback a sharp operation feeling.

Now an example of the configuration of vibration actuator 10 is described below.

General Configuration of Vibration Actuator 10

FIGS. 4 to 9 are a perspective view, plan view, front view, bottom view, right side view and exploded perspective view, respectively of an external appearance of the vibration actuator according to Embodiment 1 of the present invention.

Vibration actuator 10 is a flat (card-shaped) vibration actuator, and vibrates by moving the movable member in the direction orthogonal to the thickness direction when the thickness direction is set as the Z direction. For example, in the case where vibration actuator 10 is attached to a touch panel as a tactile feel presentation part, it is disposed to face the rear surface side of touch panel 5, so as to vibrate in accordance with the pressing from touch panel 5 side and transmit the vibration to touch panel 5 side as a tactile feedback.

Vibration actuator 10 includes actuator body A and load detection module K. Load detection module K includes deformation member 80, and deformation detector 70 provided to deformation member 80.

Vibration actuator 10 is provided in an apparatus (such as tactile feedback apparatus 1 illustrated in FIG. 17) including the tactile feel presentation part such as touch panel 5, for example. In this case, the deformation of deformation member 80 when touch panel 5 is pressed and operated is detected by deformation detector 70. Vibration actuator 10 vibrates in accordance with the detection result of deformation detector 70, and gives touch panel 5 the vibration. In this manner, when touch panel 5 is operated, a tactile sensation is provided to the user through touch panel 5, i.e., the tactile feedback is achieved.

Actuator Body A

Figure 10:
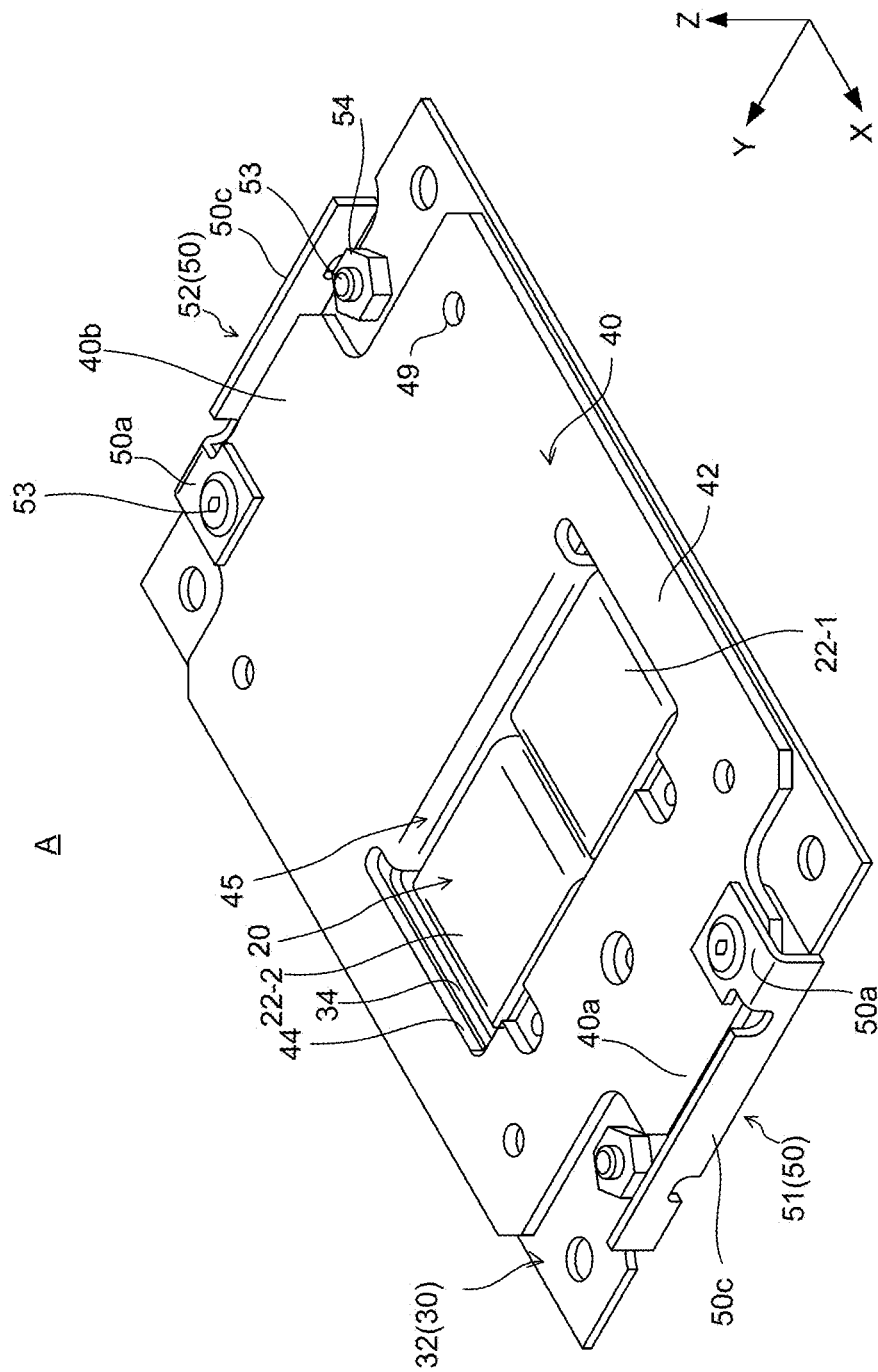
FIG. 10 is a perspective view of an actuator body illustrating a support structure with an elastic support part including an elastic support part.
Figure 11:
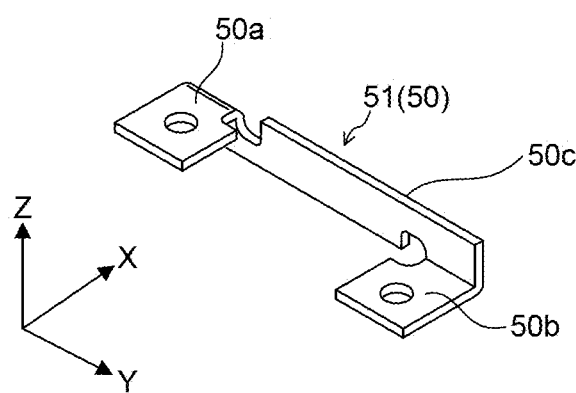
FIG. 11 is a perspective view of the elastic support part.

FIG. 10 is a perspective view of actuator body A illustrating a support structure with an elastic support part including an elastic support part, and FIG. 11 is an enlarged view of the elastic support part.

For example, actuator body A illustrated in FIGS. 4 to 11 is equipped in tactile feedback apparatus 1 together with microcomputer 150 (see FIG. 17) making up a part of the drive control part, and functions as the vibration generation source of touch panel 5 as the tactile feel presentation part, which is an example of the operation apparatus.

Actuator body A includes core assembly 20 including coil 22 (22-1, 22-2) wound around core 24, fixing body 30 including base part 32, movable member 40 including movable member body 42 composed of a magnetic member, and elastic support part 50 (51, 52).

With elastic support part 50 (such as first elastic support part 51 and second elastic support part 52), actuator body A drives in one direction (e.g., the X direction or the −X direction) movable member 40 supported in a movable manner. The one direction is one direction orthogonal to the thickness direction of plate-shaped vibration actuator 10.

Actuator body A moves movable member 40 in one direction against the biasing force of the member (elastic support part 50) generating the biasing force, and moves movable member 40 moved in one direction, in the direction opposite to one direction with the biasing force. By repeating this operation, actuator body A functions as an electromagnetic-driven electromagnetic actuator for moving (vibrating) back and forth movable member 40 straight in one direction.

With core assembly 20, actuator body A vibrates movable member body 42 of movable member 40. More specifically, movable member 40 is vibrated with the attracting force of core 24 excited by energized coil 22 and energized coil 22 and the biasing force of elastic support part 50 (51, 52).

Actuator body A has a flat shape, and vibrates movable member 40 with respect to fixing body 30 in the X direction, which is the vibration direction, orthogonal to the Z direction set as the thickness direction.

In the present embodiment, with deformation detection sensors 70a to 70d serving as the load detection part, actuator body A detects a displacement of pressed and operated touch panel 5 as a deformation of deformation member 80, and moves and vibrates movable member 40 in accordance with the detected deformation.

Fixing Body 30

In fixing body 30, core assembly 20 is fixed to plate-shaped base part 32 serving as the fixing body, and elastic support part 50 (51, 52) that is coupled to movable member 40 so as to movably support movable member 40 with respect to fixing body 30 in the vibration direction is fixed.

Base part 32 is a flat member, and forms the bottom surface of actuator body A, or in other words, the bottom surface of vibration actuator 10. Base part 32 is provided with opening 34, and core assembly 20 is fixed to base part 32 with securing member 26 such as a screw or the like such that coils 22-1 and 22-2 are located inside opening 34.

In base part 32, spring connecting part 36 (see FIG. 9) where one end portions 50b and 50b of elastic support part 50 (51, 52) are fixed is provided at base tip end portion 30a and base bottom end portion 30b with core assembly 20 sandwiched therebetween.

Figure 8:
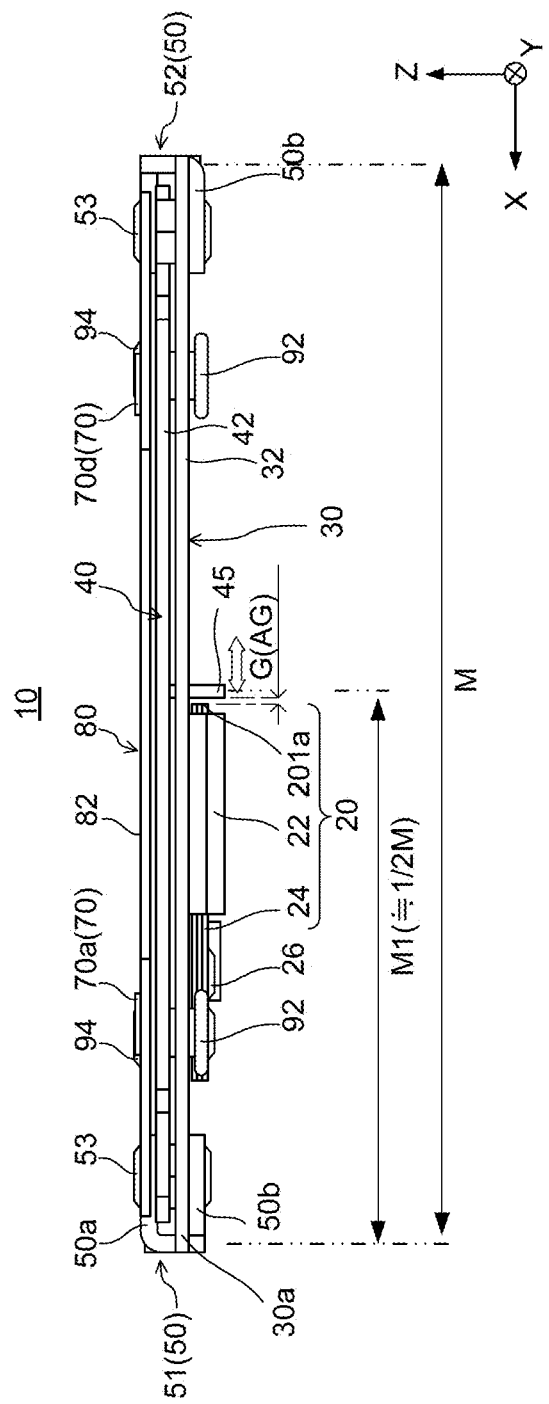
FIG. 8 is a right side view of the vibration actuator.

In base part 32 is formed such that the distance between spring connecting part 36 of base tip end portion 30a and the attracting force generation part of core assembly 20, and the distance between spring connecting part 36 of base bottom end portion 30b and the attracting force generation part are approximately the same. Attraction part 45 or the attracting force generation part of core assembly 20, and the portion between attraction part 45 and the attracting force generation part of core assembly 20 are located at the center between spring connecting parts 36 in the front-rear direction (the vibration direction) of base part 32. For example, as illustrated in FIG. 8, attraction part 45 is disposed at or near ½M of length M between elastic support parts 51 and 52 in the vibration direction (the X direction and the −X direction). Note that in the vibration direction (the X direction and the −X direction), M1 may be the length from one of elastic support parts 51 and 52 to attraction part 45.

In addition, base tip end portion 30a and base bottom end portion 30b are provided with fixation hole 38 for fixing base part 32 to base part 3 side (boss 3a illustrated in FIG. 3). Fixation hole 38, provided at four corners of base part 32, reliably fixes base part 32 to boss 3a (see FIG. 3) of base part 3.

Base part 32 is formed by processing a sheet metal into a rectangular plate shape, with the longitudinal direction set in the X direction as the vibration direction, and one side portion and the other side portion in the longitudinal direction set as base tip end portion 30a and base bottom end portion 30b.

Opening 34 has a shape corresponding to the shape of core assembly 20. Opening 34 is formed in a rectangular shape that is long in the width direction (the Y direction) such that the attracting force generation part of core assembly 20 is disposed to face attraction part 45 of the movable member with a space therebetween in the vibration direction (the X direction) at the center portion of base part 32. Note that the configuration of opening 34 is not limited as long as coil 22 of core assembly 20 is disposed inside opening 34 and the attracting force generation part faces attraction part 45 in the vibration direction.

In opening 34 coil 22 of core assembly 20 is fixed from the bottom surface (the surface on the side opposite to the top surface, which is the surface facing movable member 40) side of base part 32. In this manner, the length (thickness) of the entire vibration actuator in the Z direction is small in comparison with the configuration in which core assembly 20 is attached on base part 32. In addition, core assembly 20 is fixed with a screw as securing member 26 in the state where its part, or a part of the bottom surface side in this case, is fit inside opening 34. In this manner, core assembly 20 is firmly fixed to base part 32 in the state where it is less removed from base part 32.

When energized by coil 22, core assembly 20 vibrates (moves back and forth straight in the X direction) movable member body 42 of movable member 40 through the cooperation of elastic support part 50 (51, 52) and attraction part 45.

Figure 12:
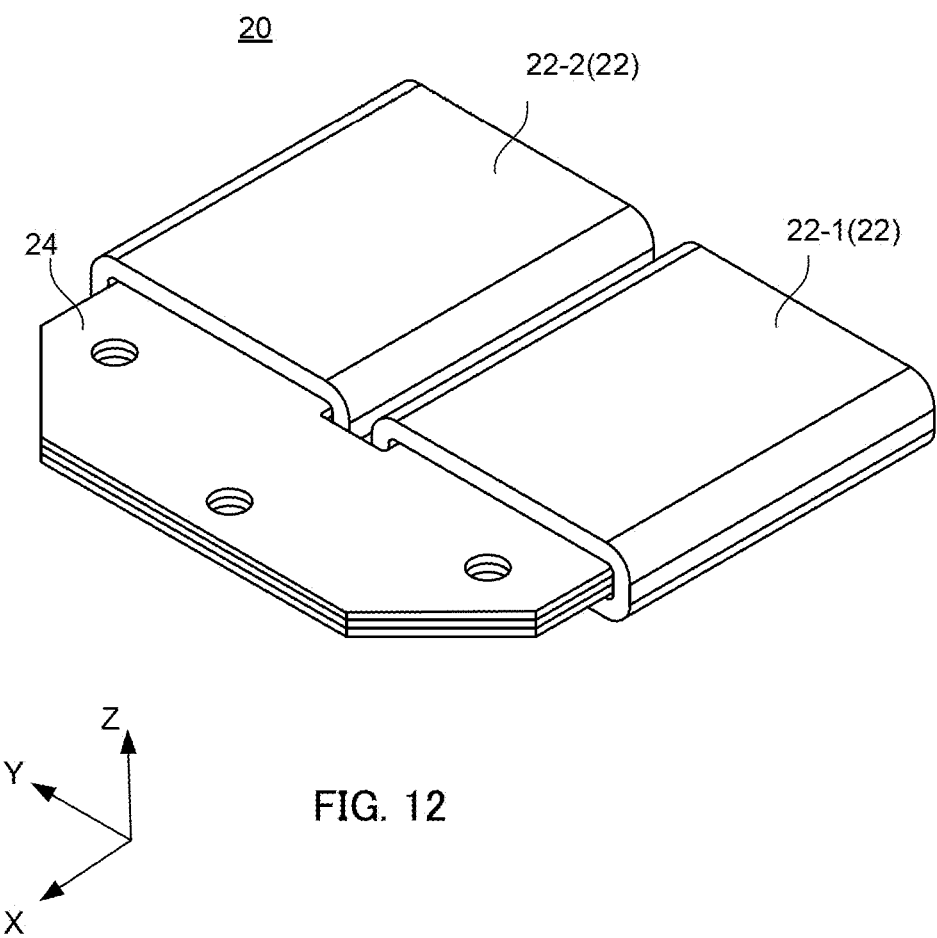
FIG. 12 is a perspective view illustrating an example of a core assembly.

FIG. 12 is a perspective view illustrating an example of a core assembly 20. As illustrated in FIG. 12, core assembly 20 of the present embodiment is formed such that flat coils 22-1 and 22-2 are inserted outside the respective parallel sides of flat core 24 formed in a U-shape.

Coil 22 (22-1, 22-2) is energized at the driving of actuator body A, and serves as a solenoid that generates the magnetic field. Coil 22 makes up a magnetic circuit (magnetic path) that attracts and moves movable member 40 together with core 24 and attraction part 45 of movable member 40.

Note that the power supplied to coil 22 from an external power source through substrate 23 (which corresponds to actuator driver 160, or may be actuator driver 160A, for example). For example, by supplying the driving current to vibration actuator 10 (actuator body A) through actuator driver 160 (see FIG. 17), the power is supplied to coil 22 and actuator body A is driven.

At core 24, the two end portions of the U-shape are magnetic poles 201a and 201b that are excited through the energization of coil 22, and make up the magnetic attractive force generation part. Magnetic poles 201a and 201b are linearly disposed side by side in the Y direction at a middle position between base tip end portion 30a and spring connecting part 36 of base bottom end portion 30b.

In addition, magnetic poles 201a and 201b are disposed to face attraction part 45 of movable member 40 with gap G therebetween in the X direction. Preferably, each of magnetic poles 201a and 201b has a planar shape. Specifically, the winding shaft of coil 22 is aligned with the front-rear direction, i.e., the vibration direction, and fixed such that both magnetic poles 201a and 201b are oriented from tip end portion (referred to also as "base tip end portion") 30a side of base part 32 to bottom end portion 30b side.

Core 24 is a magnetic member made of soft magnetic material or the like, and is composed of a silicon steel sheet, permalloy, ferrite or the like, for example. In addition, core 24 may be composed of electromagnetic stainless steel, sintered material, metal injection molded (MIM) material, laminated steel sheet, electro-galvanized steel sheet (SECC), or the like.

Magnetic poles 201a and 201b are excited through energization to coil 22 so as to attract and move attraction part 45 of movable member 40 separated in the vibration direction (the X direction). More specifically, magnetic poles 201a and 201b function as the attracting force generation part with the generated magnetic flux, and attract attraction part 45 of movable member 40 disposed to face them through gap G. Note that gap G is the space between the attracting force generation part and attraction part 45 in the X direction, and the space for determining the movable region of movable member 40.

The configuration of core 24 is not limited as long as it makes up a magnetic circuit that is magnetized through the energization of coil 22 so as to move attraction part 45 in the X direction with attraction part 45 and magnetic poles 201a and 201b serving as the attracting force generation part.

Movable Member 40

Movable member 40 is disposed in a manner overlapping base part 32 in the thickness direction of actuator body A so as to be movable in the vibration direction, such as the X direction, which is the direction orthogonal to the thickness direction. Movable member 40 includes plate-shaped movable member body 42, and attraction part 45 provided at movable member body 42 and disposed to face magnetic poles 201a and 201b.

Movable member 40 is disposed in a suspended manner so as to be movable with respect to base part 32 in the vibration direction (the X direction) through elastic support part 50 (51, 52) separated in the vibration direction.

Movable member body 42 is a plate-shaped member composed of a magnetic member such as an electromagnetic stainless-steel, sintered material, a MIM (metal injection mold) material, a lamination steel sheet, an electricity zinc plating steel sheet (SECC) or the like, and is formed by processing an SECC plate, for example.

Movable member body 42 includes opening 44 formed in a manner corresponding to core assembly 20 of base part 32. Coils 22-1 and 22-2 are disposed inside opening 44, and thus the thickness of the entire vibration actuator is reduced. That is, with opening 44 provided in movable member body 42, the entire thickness of actuator body A, and in turn, vibration actuator 10 can be reduced in comparison with the case where no opening 44 is provided. In addition, since coil 22 of core assembly 20 is located inside opening 44, movable member body 42 is not disposed near coil 22, and thus reduction in the conversion efficiency due to the leaked magnetic flux leaked from coil 22 can be suppressed, while achieving high output.

Movable member body 42 is fixed to deformation member 80 so as to be attached to an operation apparatus such as touch panel 5.

Movable member body 42 is formed in a rectangular plate shape surrounding opening 44. Movable member body 42 is fixed to a part of deformation member 80. In the present embodiment, through fitting (in the present embodiment, thread engagement) of stopper pin 94 and stopper receipt portion 92 of movement restriction part 90, movable member body 42 is fixed to a part of deformation member 80 (see FIG. 13). Note that FIG. 13 is a sectional view taken along line A-A of FIG. 7 with deformation member 80 located on the upper side.

Figure 9:
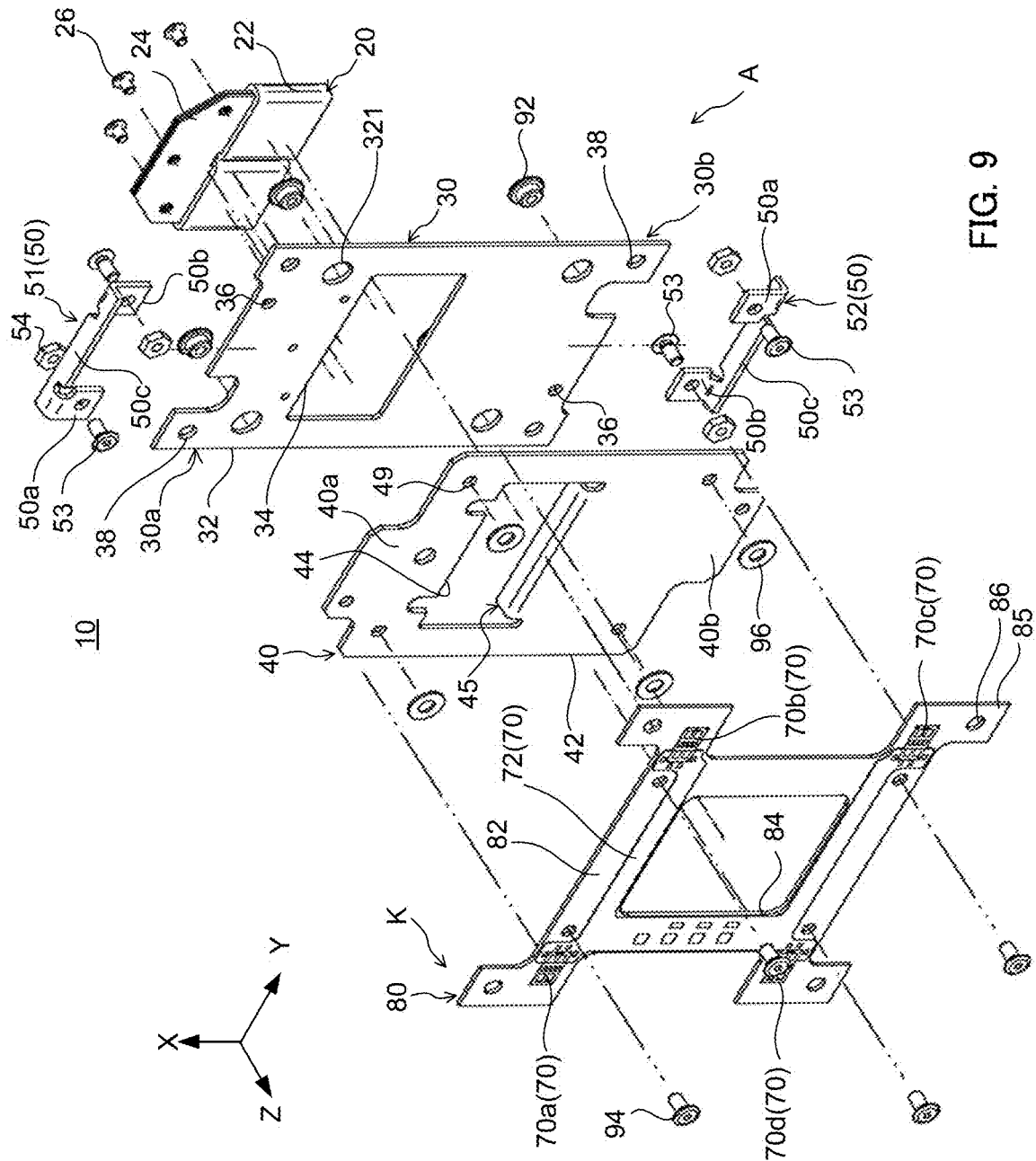
FIG. 9 is an exploded perspective view of the vibration actuator.
Figure 13:
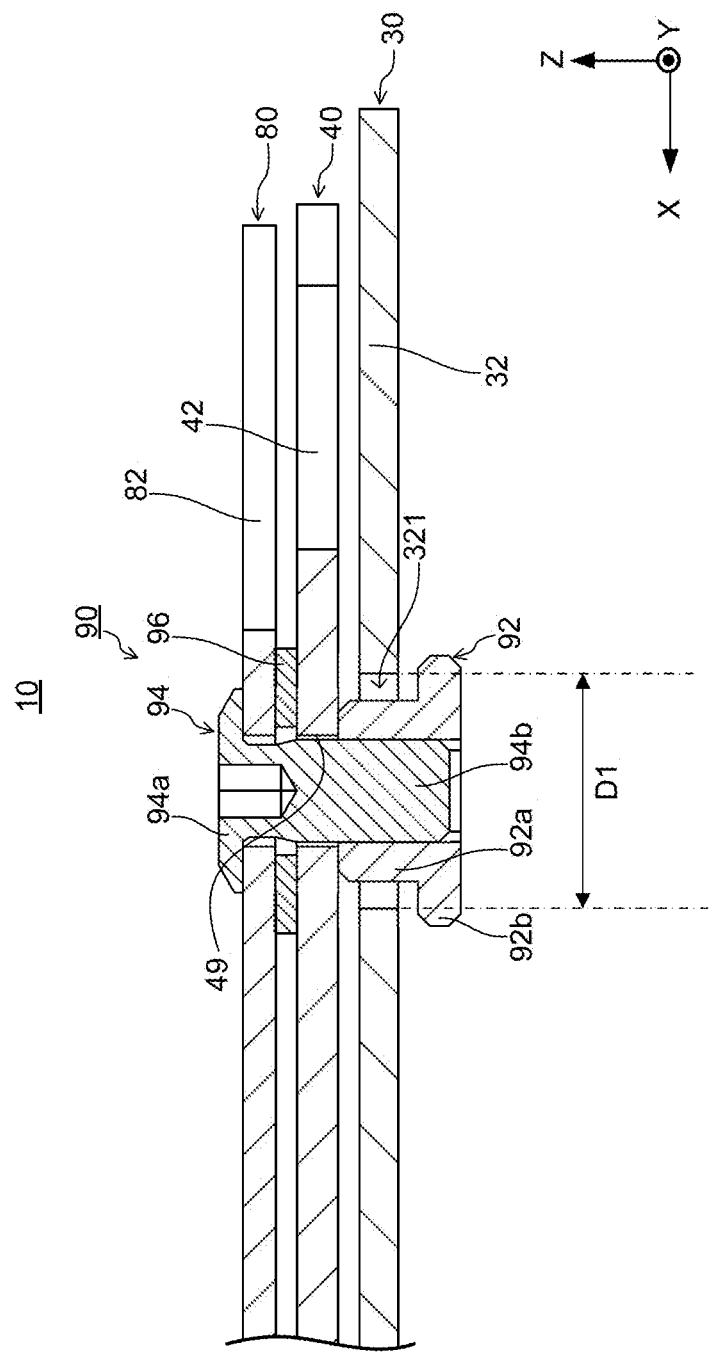
FIG. 13 is a sectional view taken along line A-A of FIG. 7.

As illustrated in FIGS. 9 and 13, at a position between fixing body 30 and movable member 40, movement restriction part 90 restricts the relative movement range of movable member body 42 in the thickness direction (the Z direction), width direction (the Y direction), or front-rear direction (the X direction) with respect to base part 32 of fixing body 30. Here, the restriction of the front-rear movement is defined by the gap between internal diameter D1 of through hole 321 of base part 32 and the outer diameter of the movable member side portion (in this case, stopper receipt portion 92) disposed in through hole 321.

Stopper receipt portion 92 includes cylindrical insertion part 92a inserted to the through hole of base part 32 and flange part 92b provided on one end side of insertion part 92a. More specifically, stopper receipt portion 92 is a screw receptacle part, and a female screw part is provided at the inner peripheral surface of insertion part 92a. Stopper receipt portion 92 inserts insertion part 92a from the bottom surface side of base part 32. At this time, flange part 92b engages with the bottom surface of base part 32 so as to prevent stopper receipt portion 92 from going to the top surface side of base part 32.

Stopper pin 94 inserted from deformation member 80 side is inserted and fixed at stopper receipt portion 92. Stopper receipt portion 92 and stopper pin 94 make up a retainer part.

Stopper pin 94 includes flange part 94a that is engaged at the top surface of deformation member 80, and pin shaft 94b continuous from flange part 94a.

Pin shaft 94b of stopper pin 94 is inserted into the through hole of deformation member 80 from the top surface side of deformation member 80, and passed through movable member body 42 through washer 96. In the present embodiment, stopper pin 94 is a screw threadedly engaged with stopper receipt portion 92, which is the screw receptacle. A male screw part that is threadedly engaged with the female screw part of insertion part 92a is provided at the outer periphery of pin shaft 94b.

When pin shaft 94b is fit, i.e., threadedly engaged, to insertion part 92a of stopper receipt portion 92, deformation member 80 and movable member body 42 through which pin shaft 94*b* is inserted are sandwiched through washer 96 with the end of insertion part 92*a* and flange part 94*a* of stopper pin 94. In this manner, deformation member 80 and movable member body 42 are restricted by movement restriction part 90 such that they integrally move with respect to base part 32 within a predetermined range in the X direction and Z direction.

Movable member body 42 is integrally fixed to frame part 82 of deformation member 80 through movement restriction part 90. In addition, movable member body 42 is joined to elastic support part 50 (51, 52) at tip end portion 40*a* and bottom end portion 40*b*.

Attraction part 45 is attracted to magnetized magnetic poles 201*a* and 201*b* at core assembly 20, and is disposed to face magnetic poles 201*a* and 201*b* in the vibration direction. In the present embodiment, attraction part 45 is bent such that a part of movable member body 42 extends downward. Attraction part 45 is a planar magnetic member, and makes up the magnetic circuit together with core assembly 20.

Elastic Support Part 50 (51, 52)

Elastic support part 50 (51, 52) supports movable member 40 such that movable member 40 is movable with respect to fixing body 30. Elastic support part 50 (51, 52) supports movable member 40 in the state where movable member 40 is suspended over base part 32 of fixing body 30, such that movable member 40 is movable in the X direction that is the direction (the direction orthogonal to the thickness direction) orthogonal to the direction in which base part 32 and movable member body 42 overlap each other. Note that elastic support parts 51 and 52 have a point symmetrical shape with respect to the center of movable member 40, and in the present embodiment they are similarly formed members. FIG. 11 illustrates elastic support part 51.

Elastic support part 50 sets the movable member body 42 to base part 32 such that attraction part 45 is disposed to face magnetic poles 201*a* and 201*b* of core 24 of fixing body 30 with gap G therebetween.

Elastic support part 50 is a leaf spring (spring plate member). It includes the other end portion 50*a* fixed to movable member body 42, one end portion 50*b* fixed to base part 32, and elastic deformation part 50*c* that couples one end portion 50*b* and the other end portion 50*a*. One end portion 50*b* and the other end portion 50*a* are separated in the Y direction, and elastic deformation part 50*c* is disposed with its thickness direction aligned with the X direction so as to extend in the Y direction, i.e., the direction orthogonal to both the vibration direction and the thickness direction. The thickness direction of elastic deformation part 50*c* is set as the vibration direction so as to have the deflection length in the length in the Y direction.

In this manner, elastic support part 50 appropriately sets the length of elastic deformation part 50*c* along the width direction (the Y direction), and thus can couple base part 32 and movable member body 42 with one end portion 50*b* and the other end portion 50*a* at the both ends.

In addition, elastic deformation part 50*c* is fixed on bottom end portion 40*b* side and tip end portion 40*a* side of movable member 40, with the thickness direction aligned with the X direction and the extending direction aligned with the Y direction. It suffices that elastic support part 50 ensures the installation space in the extending direction for elastic deformation part 50*c* that is actually deformed, by the length in the width direction (the Y direction). In this manner, the size of elastic support part 50 itself can be reduced to achieve cost reduction and improved assemblability, and a case where the spring constant in vibration actuator 10 has to be reduced can be easily handled.

Note that basically elastic deformation part 50*c* deforms in a vibrating manner movable member 40 with respect to fixing body 30 in the vibration direction, i.e., the X direction orthogonal to the Z direction set as the thickness direction. Elastic deformation part 50*c* couples one end portion 50*b* fixed to base part 32 and the other end portion 50*a* fixed to movable member body 42 in a separated manner in the Y direction, and thus the resonance point of the Z direction vibration can be set in the vicinity of the resonance point of the X direction vibration of elastic deformation part 50*c*. In this manner, elastic deformation part 50*c* can deform in a vibrating manner movable member 40 in both the X direction and the Z direction as the vibration direction with respect to fixing body 30.

Figure 14:
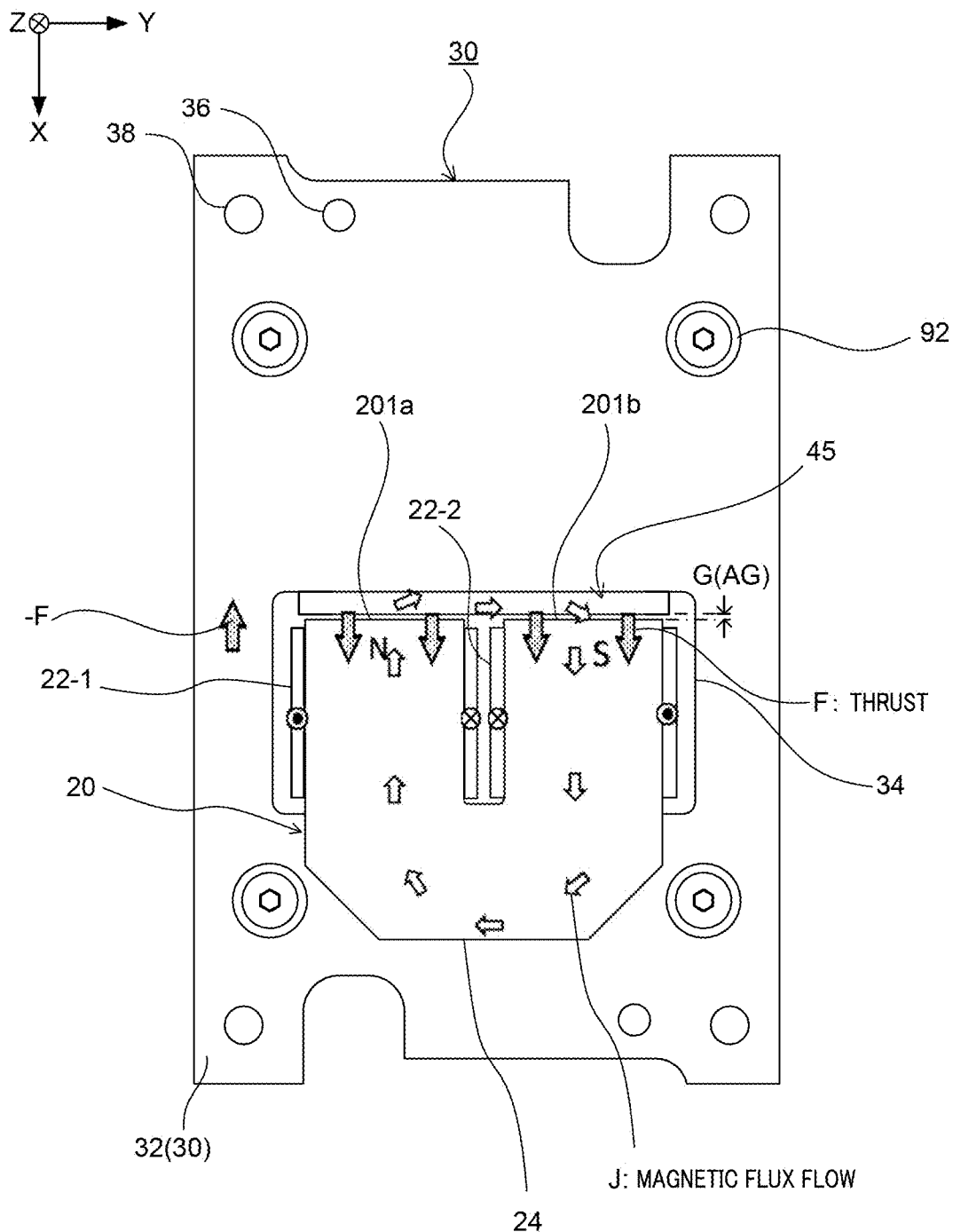
FIG. 14 is a diagram illustrating a magnetic circuit configuration of the vibration actuator of the tactile feedback apparatus according to the embodiment of the present invention.

FIG. 14 is a diagram illustrating a magnetic circuit configuration of vibration actuator according to Embodiment 1 of the present invention. The magnetic circuit has magnetic flux flow J not only in the portion illustrated in the drawing, but also in the portion not illustrated in the drawing.

More specifically, when coil 22 is energized, core 24 is excited and the magnetic field is generated, with the both end portions of core 24 serving as magnetic poles 201*a* and 201*b*, i.e., the magnetic attractive force generation part. For example, magnetic pole 201*a* is the N pole and magnetic pole 201*b* is the S pole in core 24 in FIG. 14. As a result, the magnetic circuit represented by magnetic flux flow J is formed between core assembly 20 and movable member body 42. Magnetic flux flow J in the magnetic circuit flows from magnetic pole 201*a* to attraction part 45 of movable member body 42 facing magnetic pole 201*a*, and passes through attraction part 45 of movable member body 42 to flow to magnetic pole 201*b* from the portion facing magnetic pole 201*b* at attraction part 45, and reach inside core 24.

In this manner, by the principle of electromagnetic solenoids, magnetic poles 201*a* and 201*b* of core assembly 20 generate attracting force (thrust) F for attracting attraction part 45 of movable member body 42, and attraction part 45 of movable member body 42 is attracted by both magnetic poles 201*a* and 201*b* of core assembly 20. Movable member 40 including movable member body 42 moves in the direction of attracting force F against the biasing force of elastic support part 50.

In addition, when the energization to coil 22 is released, the magnetic field is eliminated, and the attracting force F of core assembly 20 for movable member 40 is eliminated, thus resulting in the movement in the direction of the original position (the movement in −F direction) with the biasing force of elastic support part 50.

By repeating this operation, movable member 40 moves back and forth so as to generate the vibration in the vibration direction (the X direction) in actuator body A.

Note that preferably, the range of the displacement amount of movable member 40 is an applicable range of the vibration corresponding to the display pressed by the user on the screen of touch panel 5 serving as an operation apparatus, for example. For example, in the case where the display to be pressed by the user on the screen of touch panel 5 is a mechanical button or various switches, the range is an amplitude range that can provide the same tactile sensation as that of the actual press of the mechanical button or various switches. This range is set based on a fact that the tactile sensation is insufficient when the displacement of the amplitude of movable member 40 is small whereas the tactile sensation is uncomfortable when the displacement is large.

For example, the displacement amount may be set within the range from 0.03 mm to 0.3 mm.

In actuator body A, attraction part 45 of movable member body 42 is disposed to face magnetic poles 201a and 201b of core assembly 20 at a close position, and thus magnetic circuit efficiency can be increased while achieving the high output. In addition, actuator body A can be driven without using the magnet, and thus the cost can be reduced.

Since belt-shape elastic deformation part 50c is disposed with the thickness direction aligned with the vibration direction in a plurality of elastic support parts 50 (51, 52) so as to support movable member 40, it is only necessary to ensure the movable region in the vibration direction, thus achieving a compact actuator.

Core assembly 20 including core 24 on which coil 22 is wound is fixed such that coil 22 is located inside opening 34 of base part 32 of fixing body 30, and disposed with respect to movable member 40 such that it is disposed inside opening 44 of movable member body 42 disposed to overlap base part 32.

In this manner, it is not necessary to provide, in a manner overlapping in the Z direction (e.g., a coil and a magnet facing in the Z direction), members in fixing body 30 and movable member 40 for generating the magnetism and driving the movable member in the X direction. Thus, the thickness in the Z direction of actuator body A as an electromagnetic actuator can be reduced. In addition, a vibration as a tactile feel can be provided to the operation apparatus by moving movable member 40 back and forth straight without using a magnet. In this manner, the design can be simplified with the support structure having a simple structure, space-saving can be achieved, and the thickness of the actuator body A can be reduced.

The driving principle of actuator body A is briefly described below. Actuator body A, i.e., vibration actuator 10 can be driven by generating resonance by using pulses with the equation of motion and circuit equation described below. Note that as the operation, rather than the resonance drive, the sense of operation of a mechanical switch displayed on a touch panel as an operation apparatus is expressed, and it is driven by inputting a plurality of current pulses through actuator driver 160 (see FIG. 17) and the like.

Note that movable member 40 in actuator body A moves back and forth based on Equations (1) and (2).

(Equation 1)

$$m\frac{d^2x(t)}{dt^2} = K_f i(t) - K_{sp} x(t) - D\frac{dx(t)}{dt} \quad [1]$$

M: mass[kg]
X (t): displacement [m]
Kf: thrust constant [N/A]
I (t): current [A]
Ksp: spring constant [N/m]
D: attenuation coefficient [N/(m/s)]

(Equation 2)

$$e(t) = Ri(t) + L\frac{di(t)}{dt} + K_e \frac{dx(t)}{dt} \quad [2]$$

E (t): voltage [V]
R: resistance [Ω]
L: inductance [H]
Ke: counterelectromotive force constant [V/(m/s)]

Specifically, mass m [Kg], displacement x(t) [m], thrust constant $K_f$ [N/A], current i(t) [A], spring constant $K_{sp}$ [N/m], attenuation coefficient D [N/(m/s)] in actuator body A and the like can be appropriately changed as necessary as long as Equation (1) is met. In addition, voltage e(t) [V], resistance R [Ω], inductance L [H], and counterelectromotive force constant $K_e$ [V/(m/s)] can be appropriately changed as necessary as long as Equation (2) is met.

In this manner, it is determined by actuator body A, the mass m of movable member and spring constant $K_{sp}$ of the metal spring (an elastic body; a leaf spring in the present embodiment) as elastic support part 50.

Load Detection Module K

Load detection module K is described with reference to FIGS. 4 to 7 and 9. Load detection module K is disposed between movable member 40 of actuator body A and a tactile feel presentation part (e.g., touch panel 5) for providing the vibration, and fixed to movable member 40 and touch panel 5.

Load detection module K detects at deformation detector 70 the deformation generated at deformation member 80 in accordance with the pressing operation of touch panel 5. The detected deformation is output to a control part (e.g., the microcomputer illustrated in FIG. 17), and the control part generates a vibration by driving actuator body A in accordance with the deformation.

Deformation Member 80

Deformation member 80 includes frame part 82 fixed to movable member body 42 of movable member 40, opening 84, and presentation part connecting part 86 fixed to the vibration presenting part such as touch panel 5.

Deformation member 80 functions as a deformation member that generates deformation when an external force of a pressing operation at vibration presenting part is applied. In the present embodiment, deformation member 80 is formed in a rectangular frame plate shape by processing a sheet metal. This shape is a shape that surrounds the portion to be pressed and operated in the vibration presenting part on the rear surface side of the vibration presenting part when fixed to a planar vibration presenting part.

In deformation member 80, connection arm part 85 extends in the longitudinal direction from the four corners of frame part 82 with a flat plate rectangular frame shape. In deformation member 80, deformation detection sensors 70a to 70d are disposed at the portion of frame part 82 where the bottom end portion of connection arm part 85 is connected.

Presentation part connecting part 86 is provided at connection arm part 85, and deformation member 80 is fixed to touch panel 5 through presentation part connecting part 86. In this manner, deformation member 80 is fixed to touch panel 5 through presentation part connecting part 86 of connection arm part 85, and frame part 82 is fixed to movable member body 42 of movable member 40, and thus, the function as the deformation member is mainly provided by connection arm part 85.

Deformation Detector 70

Deformation detector 70 is integrally provided to deformation member 80, and includes a deformation detection part that detects the deformation generated by the load exerted on deformation member 80 serving as the deformation member, for the purpose of driving actuator body A.

Deformation detector 70 is substrate 72 on which a plurality of deformation detection sensors 70a to 70d as the deformation detection part is mounted, and a circuit for electrically connecting the plurality of deformation detection sensors 70a to 70d is mounted. Note that substrate 72 may be composed of a flexible printed board (hereinafter may be referred to as FPC (flexible printed circuits)) or the like.

When the vibration presenting part is operated, deformation detector (load sensor) 70 detects the pushing amount of deformation member 80 that is displaced together with movable member 40 as the pushing amount of the vibration presenting part.

Deformation detection sensors 70a to 70d detect the deformation of deformation member 80 in association with the deformation of elastic support part 50 pushed to base part 32 side together with movable member body 42. The detected deformation is output to the control part and the like, and coil 22 is energized such that the movement amount of movable member 40 corresponds to the deformation, and that movable member body 42 can be attracted and moved.

Figure 17:
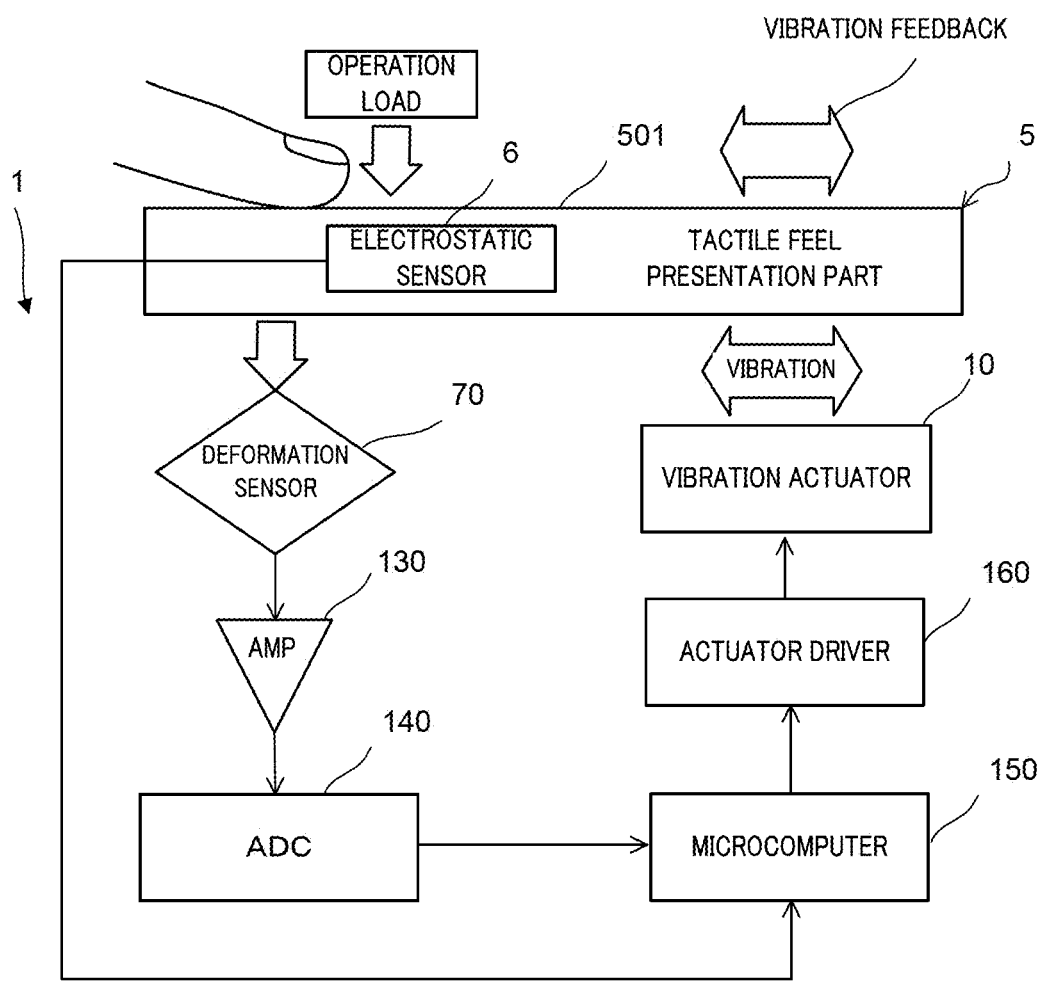
FIG. 17 is a block diagram illustrating a main configuration of the tactile feedback apparatus of the present embodiment.

It is conceivable to adopt a configuration in which in tactile feedback apparatus 1 illustrated in FIG. 17, the control part such as a microcomputer determines the movement amount of the vibration presenting part by using the deformation detected by deformation detector 70 so as to achieve the vibration feedback for the contact, for example. Note that the control part may detect the pushing amount to elastic support part 50 based on the movement amount corresponding to the actual movement amount of the operation apparatus by using a sensor for detecting the contact of the user on the operation apparatus so as to achieve more natural touch by using that detection result.

In addition, it is possible to adjust the vibration cycle of movable member 40 at the time of supply of the driving current pulse of the current pulse supply part of the control part on the basis of the detection result of the sensor that detects the contact operation of the user, i.e., the pushing amount of movable member 40 by using deformation detection sensors 70a to 70d. In addition, separately from deformation detector 70, it is possible to output to the control part an operation signal representing the operation state such that the control part operates to generate the vibration corresponding to the display state of the user contact position detected at the vibration presenting part.

With connection arm part 85 serving as the main deformation member in deformation member 80, deformation detector 70 detects its deformation and outputs the detected deformation to the control part.

More specifically, deformation detector 70 includes staple-shaped (U-shaped) substrate 72 disposed at the four corners of frame part 82 on frame part 82 of deformation member 80. That is, substrate 72 is provided such that the short part protrudes in the width direction (the Y direction) perpendicularly to the longitudinal part from the both sides of the longitudinal part extending in the longitudinal direction as the vibration direction (the X direction). Substrate 72 is formed in a U-shape with the longitudinal part and the short part.

In deformation detector 70, deformation detection sensors 70a to 70d are mounted between frame part 82 to which movable member body 42 is fixed and presentation part connecting part 86 fixed to touch panel 5, i.e., are mounted on connection arm part 85 functioning as the deformation member. In this manner, deformation detector 70 detects the deformation in connection arm part 85 of deformation member 80.

Since deformation detector 70 is provided at deformation member 80 fixed to movable member 40, detection sensors 70a to 70d are substantially disposed in movable member 40. Thus, it is possible to perform the detection at a position near the vibration presenting part on which the load is applied during the operation, and achieve stable detection. In this manner, a realistic tactile sensation resembling a touch of a switch can be immediately provided.

Preferably, deformation detection sensors 70a to 70d are provided at a plurality of locations in load detection module K while they may be disposed in one place. When vibration actuator 10 is attached to touch panel 5, it is preferable that they be radially provided at least at three locations at even the intervals around the center of the operation surface of touch panel 5. In this manner, vibration actuator 10 can accurately detect and receive at the surface the displacement of the pressed and operated vibration presenting part.

In the present embodiment, deformation detection sensors 70a to 70d are provided at four locations near presentation part connecting part 86 where they are fixed to touch panel (tactile feel presentation part) 5, and deformation detection sensors 70a to 70d detect the deformation of the corner portion portions of the frame shape surrounding the center of the pressing operation region of touch panel 5. Thus, in the case where a rectangular touch panel display is used, actuator body A can be attached with a good balance to the display through load detection module K. In this manner, the deformation direction of deformation member 80 can be stably aligned with the direction perpendicular to the surface.

Figure 15:
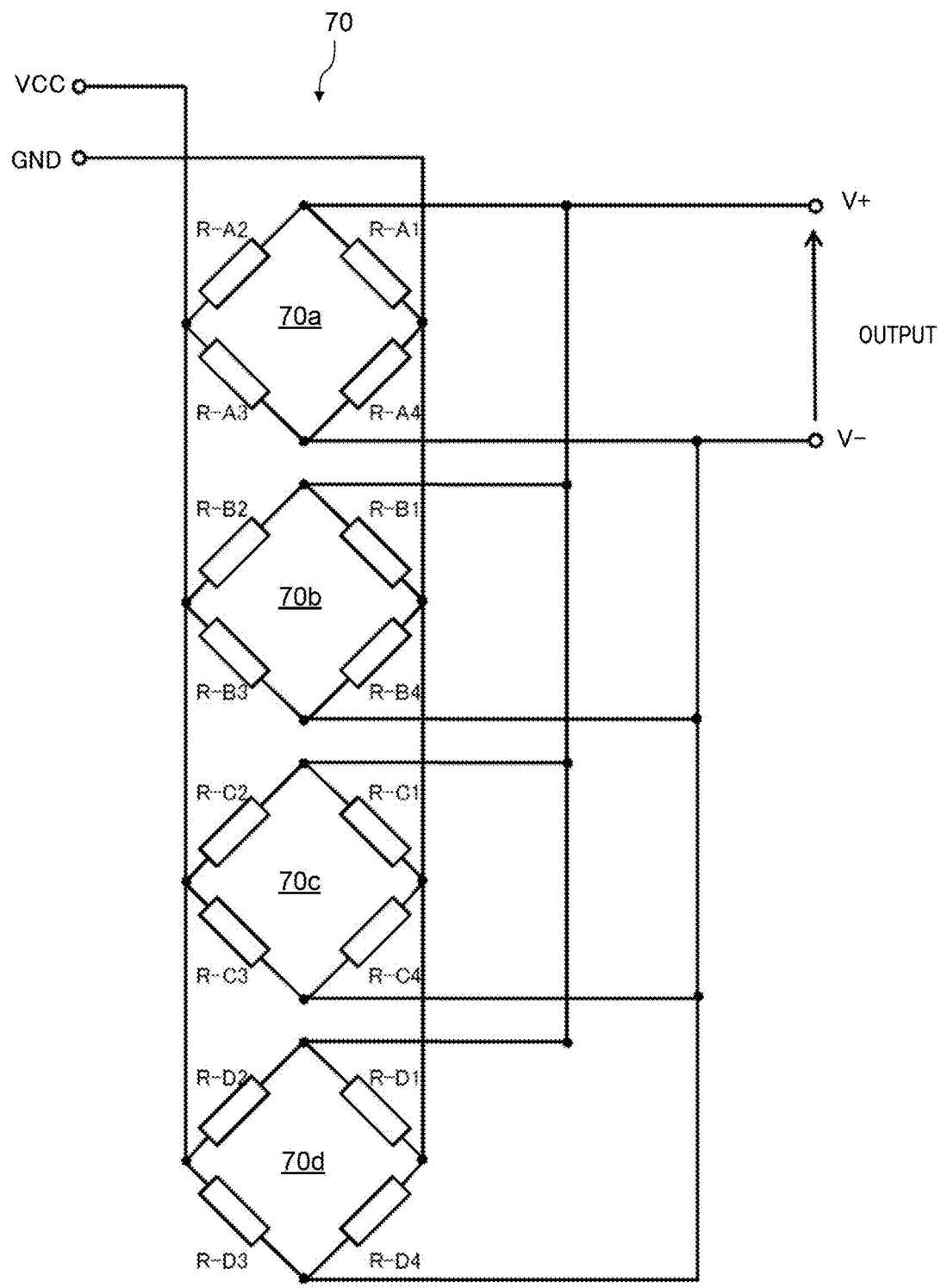
FIG. 15 is a diagram illustrating a wiring of a deformation detector.

FIG. 15 is a diagram illustrating a wiring of deformation detector 70. Deformation detection sensors 70a to 70d mounted on substrate 72 are disposed on deformation member 80 located on the same plane. Deformation detection sensors 70a to 70d are full-bridge connection deformation detection sensors including a plurality of strain gauge parts (R-A1 to R-A4, R-B1 to R-B4, R-C1 to R-C4, and R-D1 to R-D4), respectively.

Deformation detection sensors 70a to 70d are connected to power source voltage Vcc and GND in parallel to each other on substrate 72, so as to output a change amount of the electric resistance value that changes when a load is applied thereto. In this manner the outputs of deformation detection sensors 70a to 70d are averaged, and the behavior is stabilized. In addition, regarding the output value, the temperature is substantially uniformized for each of deformation detection sensors 70a to 70d, and thus the stability of the temperature can be improved.

In addition, in actuator body A, screw 53 serving a securing member is used for the fixing between base part 32 and elastic support part 50, and between elastic support part 50 and movable member 40. In the present embodiment, they are fixed with screw 53 and nut 54. In this manner, elastic support part 50, which is required to be firmly fixed to fixing body 30 and movable member 40 for the purpose of driving movable member 40, can be mechanically firmly fixed in a detachable state.

In vibration actuator 10, a stopper serving as movement restriction part 90 for preventing protrusion to deformation member 80 side is disposed between base part 32 and movable member body 42, and in turn, deformation member 80. In this manner, it is possible to restrict the movement range of movable member body 42 in the thickness direction (the Z direction), the width direction (the Y direction), or the front-rear direction (the X direction) with respect to base part 32.

Vibration Control of Vibration Actuator 10

Figure 21:
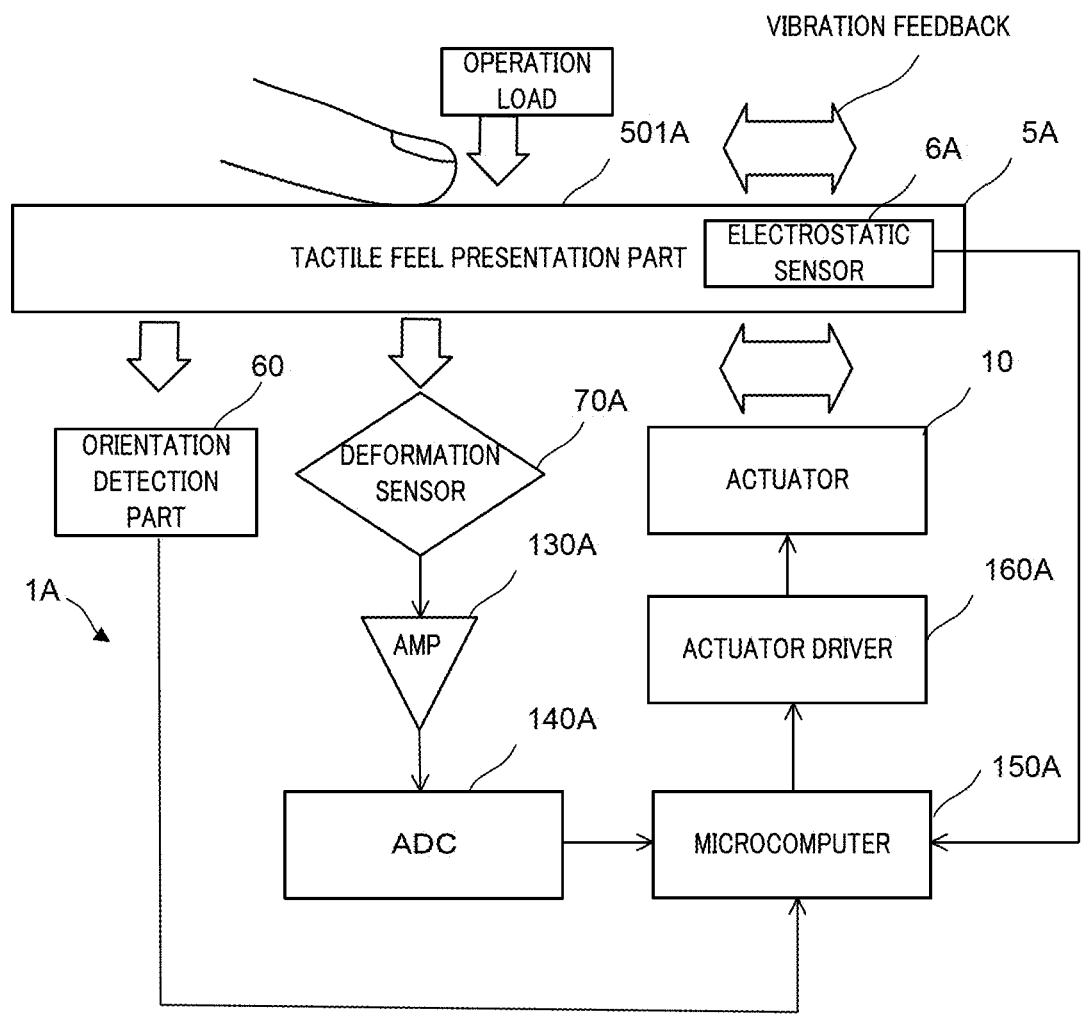
FIG. 21 is a block diagram illustrating a main configuration of the tactile feedback apparatus of the present embodiment.

Actuator body A is controlled by the drive control part (microcomputers 150 and 150A and actuator drivers 160 and 160A and the like illustrated in FIGS. 17 and 21) to drive the operation apparatus supported for elastic vibration in one vibration direction.

A driving current corresponding to the contact operation of the operation apparatus is supplied to vibration actuator 10 such that a magnetic field is generated and movable member 40 for elastic vibration is moved in one direction, i.e., the plus X direction side, with respect to fixing body 30. In this manner, when the operation apparatus is contacted, the vibration is provided to the user as a tactile sensation. In the present embodiment, the contact operation is a signal related to a contact detected by electrostatic sensor 6, and a signal representing a load detected on deformation detector 70.

To vibration actuator 10, a single current pulse or a plurality of current pulses serving as an actuator driving signal for driving vibration actuator 10 is supplied to coil 22 through the drive control part. In the present embodiment, the actuator driving signal is composed of a line of a plurality of current pulses.

When the current pulse is supplied to coil 22, movable member 40 is attracted and displaced to coil 22 side, i.e., the plus X direction side with the magnetic attractive force against the biasing force of elastic support part 50. Correspondingly, the tactile feel presentation part (e.g., touch panel 5) fixed to movable member 40 also moves to the plus X direction side with respect to base part 3 (see FIGS. 1 to 3) to which fixing body 30 is fixed.

In addition, when the supply of the driving current to coil 22 is stopped, the biasing force is released, and the state where movable member 40 is held at a position on the plus X direction side with respect to the reference position is released. As a result, with the biasing force of elastic support part 50, movable member 40 generates a vibration by being moved in a biased manner and displaced in the direction (the minus X direction side) opposite to the attraction direction (the plus X direction side) from the maximum displacement position on the plus X direction side. The generated vibration is output, and is fed back to the user as a tactile sensation.

The actuator driving signal can be generated in various vibrations in accordance with the pulse amplitudes, wavelengths, supply timings and the like of a line of a plurality of current pulses or a single current pulse, and can be supplied to actuator body A, for example. In this manner, the vibration of actuator body A is provided to the user as a tactile sensation.

Note that as the drive control part, the current pulse supply part and the voltage pulse application part are provided. The current pulse supply part supplies coil 22 of vibration actuator 10 with a plurality of driving current pulses as the driving current of vibration actuator 10 for vibrating operated part 501 in accordance with the contact operation of the operation apparatus (vibration presenting part), i.e., the information representing contact and load.

The voltage pulse application part intermittently applies, to the current pulse supply part, a plurality of control voltage pulses for generating a line of a plurality of current pulses or a single current pulse making up the actuator driving signal.

Figure 16:
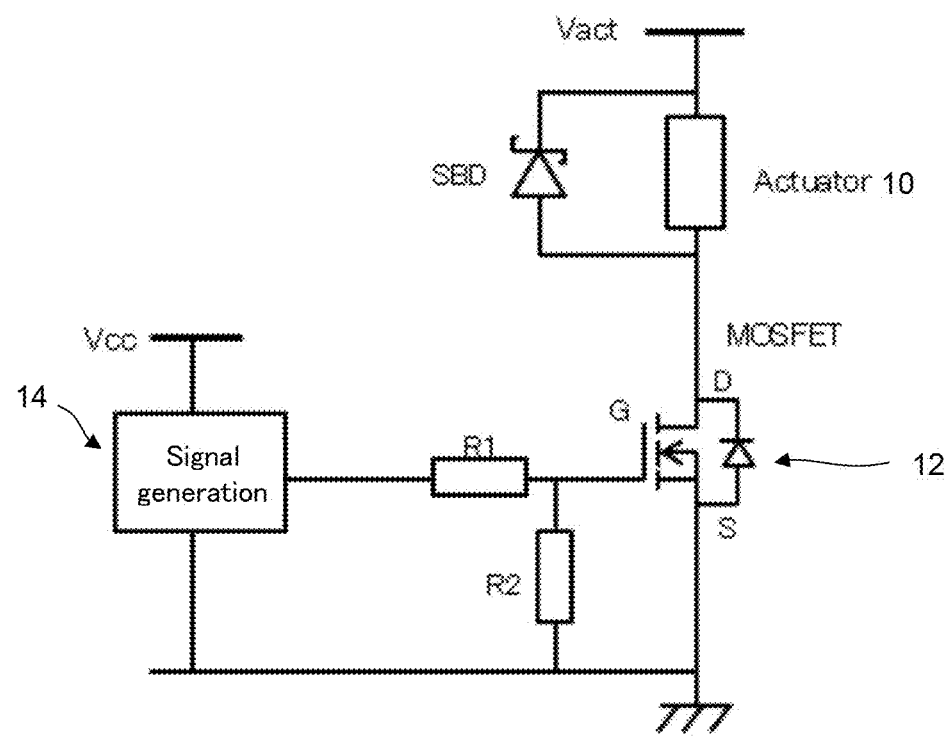
FIG. 16 is a diagram illustrating an example of a driving circuit of the actuator body.

FIG. 16 is a diagram illustrating an example of the driving circuit of actuator body A.

The driving circuit illustrated in FIG. 16 is included in the drive control part. The driving circuit includes switching element 12 serving as the current pulse supply part composed of MOSFET (metal-oxide-semiconductor field-effect transistor), signal generation part (Signal generation) 14 serving as the voltage pulse application part, and resistances R1, R2 and SBD (Schottky Barrier Diodes: shot key barrier diode).

In the drive control part, signal generation part 14 connected to power source voltage Vcc is connected to the gate of switching element 12. Switching element 12 is an electrostatic discharge switch. Switching element 12 is connected to actuator body A ([Actuator] in FIG. 16) and the SBD, and is connected to vibration actuator 10 to which the voltage is supplied from power source part Vact, or more specifically, actuator body A.

The drive control part supplies the current pulse to coil 22 to drive movable member 40 in one direction in the vibration. When a current pulse is supplied to coil 22, movable member 40 is displaced in one vibration direction against the biasing force of elastic support part 50. During the supply of the current pulse, the displacement of movable member 40 in one vibration direction is continued. When the supply of the current pulse is stopped, i.e., the input of the current pulse to coil 22 is turned off, the force of the displacement of movable member 40 in one vibration direction (the X direction) is released. Turning off of the input of the current pulse means the timing when the voltage for generating the current pulse is turned off. At the time point when the voltage is turned off, the current pulse is not completely off but is in an attenuated state.

With the biasing force of elastic support part 50 accumulated at the maximum displaceable position in the attraction direction (the plus X direction side), movable member 40 moves and displaces in the other vibration direction (the minus X direction side). A strong vibration is transmitted to the operation apparatus through movable member 40 moved to the other direction side, which is the operation apparatus side, and thus a tactile sensation is provided to the user.

In addition, when the input of the actuator driving signal to actuator body A is stopped, actuator body A releases the biasing force and moves movable member 40 to the other direction side (the minus X direction side) with the biasing force. Actuator body A vibrates movable member 40 and the operation apparatus through the input and stop of the actuator driving signal. Actuator body A vibrates the operation apparatus by driving movable member 40 without using a magnet.

Note that in the embodiment, the actuator driving signal corresponds to a line of a plurality of driving current pulses (referred to also as "current pulse") supplied to the coil 22 as the driving current for driving the movable member and the operation apparatus. In actuator body A, when the current pulse is supplied to coil 22, the movable member moves in one direction. The movable member is vibrated by repeating this operation.

Vibration actuator 10 can achieve high output with highly efficient magnetic circuit without using additional magnets, and thus can achieve cost reduction and thinning and efficiently output a vibration suitable for a tactile feedback to the operating and contacting user. This achieves the cost reduction, thinning and high output of the tactile feedback apparatus including touch panel 5. In addition, in vibration actuator 10, attraction part 45 is formed with a part of movable member body 42 bent downward. In this manner, the magnetic circuit composed together with the attracting force generation part need not be composed of a complicated member, and thus cost reduction can be achieved. In addition, with movable member body 42 and attraction part 45 composed of a sheet metal, the magnetic saturation can be suppressed by the sheet thickness of the sheet metal, and thus the vibration with high output can be achieved.

Configuration of Main Part of Tactile Feedback Apparatus 1

FIG. 17 is a block diagram illustrating a configuration of a main part of tactile feedback apparatus 1 of the present embodiment. Tactile feedback apparatus 1 includes touch panel 5, vibration actuator 10, electrostatic sensor 6 provided in touch panel 5, amplifier 130 serving as the amplification part, ADC (AD conversion part) 140, microcomputer 150, and actuator driver 160.

Tactile feedback apparatus 1 includes, as functional configurations, operated part 501 including touch panel 5 serving as the tactile feel presentation part, the contact detection part, the load detection part, and the drive control part. In the present embodiment, these parts are composed of touch panel 5, vibration actuator 10, electrostatic sensor 6, amplifier 130 serving as the amplification part, ADC (AD conversion part) 140, microcomputer 150, and actuator driver 160.

The contact detection part receives the contacting operation of the user. The contact detection part is composed of electrostatic sensor 6 and microcomputer 150 that receives a signal from electrostatic sensor 6, for example. Note that with the electrostatic sensor, a stable detection can be achieved while reducing the cost.

The load detection part detects the load applied to operated part 501 through the contact operation of the user on the operated part (the front surface of touch panel 5). The load detection part is composed of deformation sensors 70a to 70d, amplifier 130, ADC 140, and microcomputer 150 that receives the load detection signal from deformation sensors 70a to 70d through amplifier 130 and ADC 140, for example.

The load detection part stops the detection of the load during the vibration of operated part 501. The stop of the load detection during the vibration of the operated part 501 may be achieved by stopping the load detection of deformation sensors 70a to 70d, or by not receiving the output signal from deformation sensors 70a to 70d at microcomputer 150, or, by not determining that detection has been made.

The load detection part continues the stop of the detection of the load applied to operated part 501 until the vibration generated by vibration actuator 10 is attenuated. More specifically, the load detection part continues the stop of the detection of the load applied to operated part 501 until the vibration generated by vibration actuator 10 is attenuated and the displacement amount of the vibration is reduced to a predetermined rate with respect to the maximum displacement amount. For example, preferably, the predetermined rate is 0 or greater, and is $1/10$ or smaller of maximum displacement.

Figure 22:
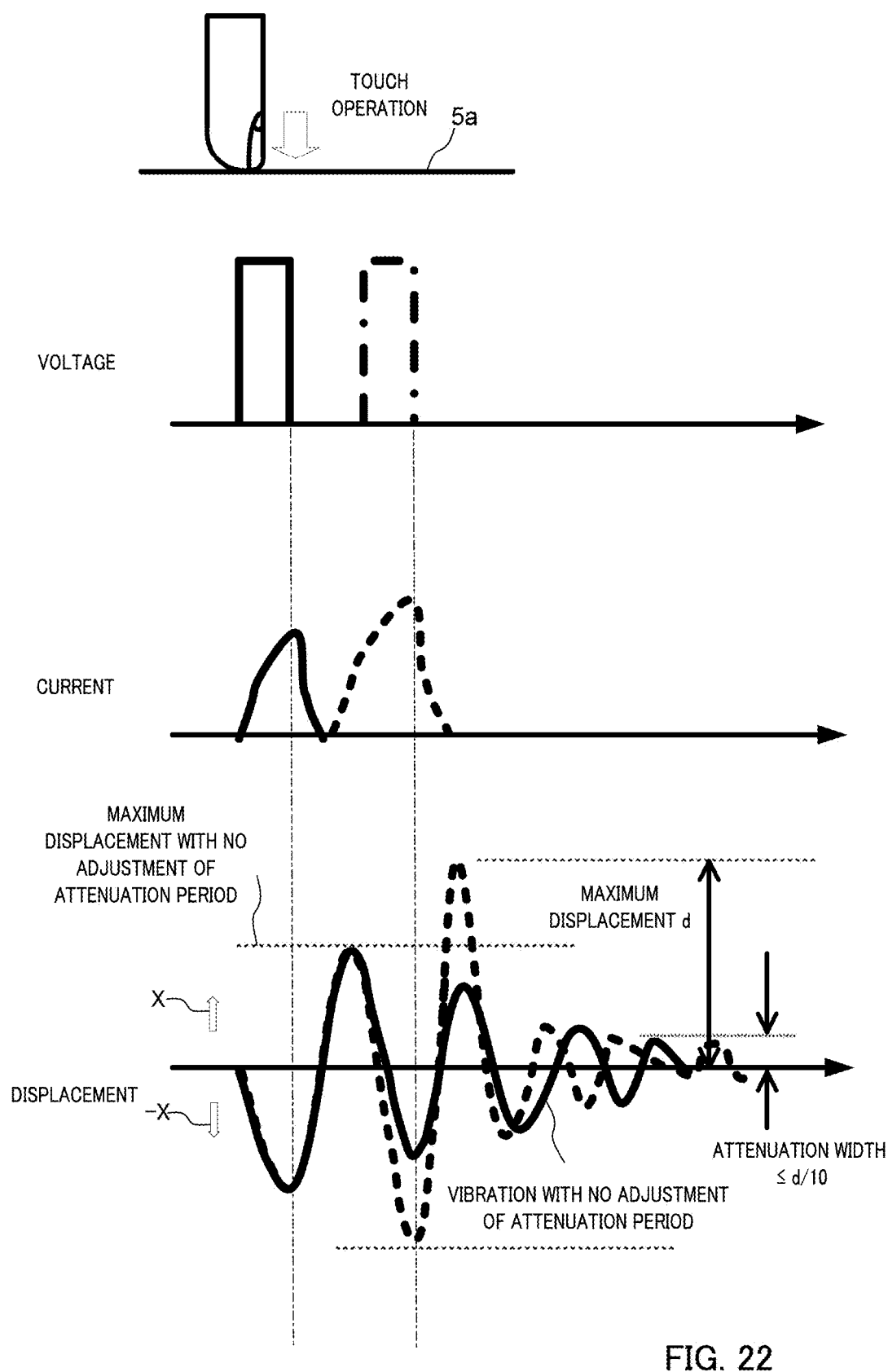
FIG. 22 is a diagram illustrating an example of a displacement amount of a movable member to which an actuator driving signal has been supplied.

FIG. 22 is a diagram illustrating an example of displacement of vibration actuator 10. FIG. 22 illustrates a current and a voltage supplied when operated part 501 is pressed, and a corresponding displacement of movable member 40 (or operated part 501). The solid line represents the transition of the attenuation with one pulse, and the broken line represents a state where a succeeding pulse is supplied at a timing until reaching $2/3$ to 1 of the vibration cycle as an example of adjustment of the attenuation period.

Here, the pulse is supplied such that a strong vibration is achieved so as to obtain a long attenuation period. The period for which the detection of the load is stopped is a period until the attenuation vibration of movable member 40 or operated part 501 or touch panel 5 is reduced to a small value, i.e., an attenuation rate of 0 to $1/10$ with respect to the maximum displacement amount d, and the load detection is stopped until the rate becomes that rate (d/10). Note that the pulse may be supplied in any manner regarding the adjustment of the attenuation period.

In the case where the drive control part inputs a pulse that can adjust the attenuation period of the vibration generated by vibration actuator 10, the load detection part continues the stop of the detection of the load applied to operated part 501 in the period from the input to the attenuation.

The attenuation period is adjusted by the next pulse supplied at a predetermined timing during the attenuation of the pulse supplied first in generation of the vibration. The load applied to operated part 501 that is detected by the load detection part is average data of data representing the load applied to operated part 501.

Figure 18A:
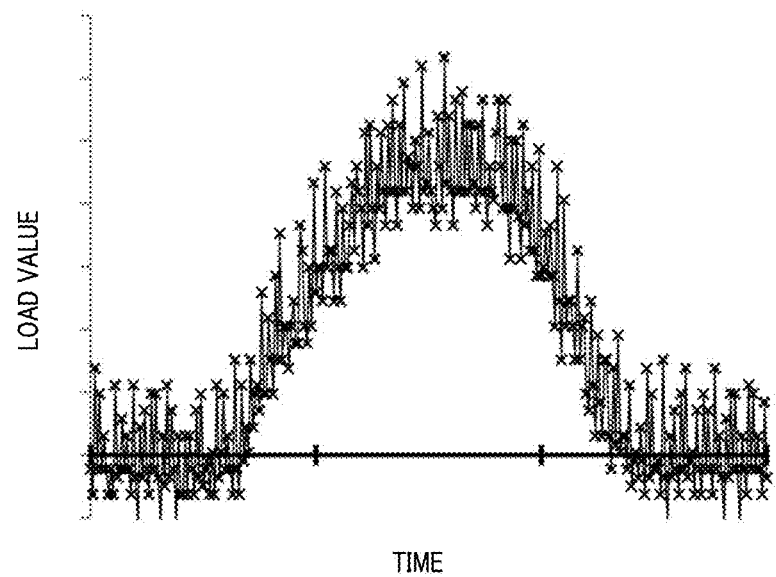
FIGS. 18A and 18B are diagrams illustrating a load detected by a load detection part.
Figure 18A:
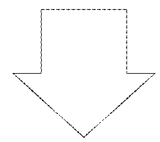
Figure 18B:
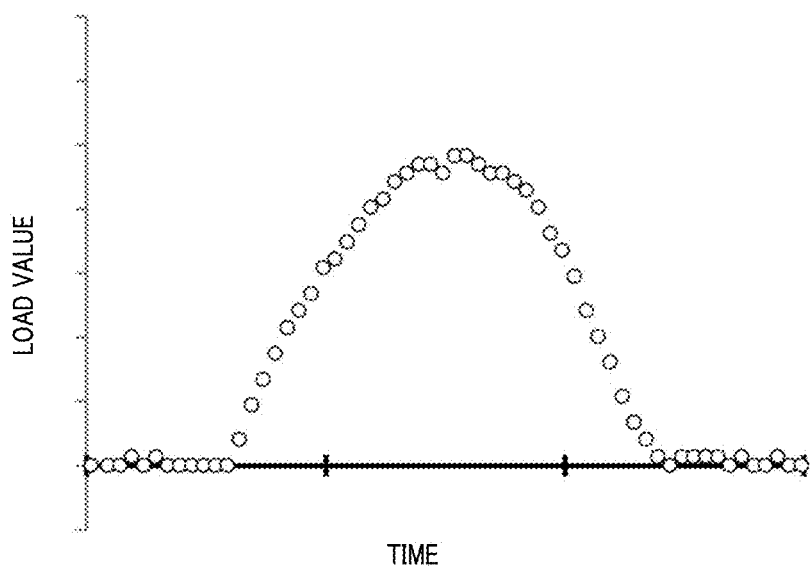

FIG. 18 are diagrams illustrating the load detected by the load detection part. FIG. 18A is a graph illustrating data before an averaging process of data representing a load detected by the load detection part, and FIG. 18B is a graph illustrating a value after the averaging process of the data representing the load detected by the load detection part.

As illustrated in FIG. 18A, the load value detected by the load detection part may possibly include electrical and mechanical noise, or may possibly be erroneous due to the influence of electrical and mechanical noise. As a result, the determination of the threshold value as the load cannot be stably performed, erroneous operations and detection may possibly occur.

In view of this, the load detection part averages the actual detection value at a predetermined time interval, and it is used for the load applied to operated part 501 that is stopped during the vibration of vibration actuator 10 as illustrated in FIG. 18B. In this manner, the variation of the determination of the threshold value is suppressed, and stable tactile feedback can be performed.

The load detection part resets the initial load value when tactile feedback apparatus 1 is activated, or each time when a certain period elapses, or, when the non-use period of tactile feedback apparatus 1 elapses for a certain period or more.

The drive control part drives vibration actuator 10 in accordance with the detection of the contact of the user on the operated part (the front surface of touch panel 5) and the detection of the load so as to vibrate operated part 501 for the feedback of the tactile sensation to the user, for example.

In the drive control part, microcomputer 150 supplies one or more current pulses to coil 22 of vibration actuator 10 through actuator driver 160 on the basis of information representing the contact from electrostatic sensor 6 and information representing the load from deformation detector 70. In the drive control part, microcomputer 150 supplies the first pulse during the vibration of movable member 40, and adjusts, with the subsequently supplied pulse, the continued vibration and the like remaining after the stop of the supply of the first pulse.

In addition, in the case where the contact position of the user on operated part 501 changes during the vibration of operated part 501, the drive control part performs the detection of the load applied to operated part 501 that is being stopped. The drive control part is composed of actuator driver 160, and microcomputer 150 that controls actuator driver 160, for example.

For example, touch panel 5 includes inside electrostatic sensor 6 serving as the contact information output part that receives the contact operation as the user operation on touch panel 5 and outputs the contact and the contact position.

Electrostatic sensor 6 detects a weak current, i.e., a capacitance change, that is generated when a finger touches the screen serving as operated part 501 to detect the touched position, and outputs it to microcomputer 150.

The signal from electrostatic sensor 6 is output to microcomputer 150 or the control part of the entire apparatus.

Regarding deformation sensors 70a to 70d, when the front surface of touch panel 5 (operated part 501) is pressed, touch panel 5 itself is displaced and the deformation of deformation member 80 is detected at load detection module K. The detected signal is input to microcomputer 150 through amplifier 130 and ADC 140.

On the basis of the signal from electrostatic sensor 6, microcomputer 150 detects the contact on the front surface of touch panel 5 (operated part 501) and its position.

Microcomputer 150 detects the load on touch panel 5 on the basis of the signal from deformation sensors 70a to 70d.

Microcomputer 150 controls the drive of the vibration actuator through actuator driver 160 so as to generate the vibration corresponding to the contact operation in accordance with the input signals, i.e., the signal representing the contact position and the contact timing from electrostatic sensor 6, and the signal representing the load based on the deformation signal from deformation sensors 70a to 70d.

Microcomputer 150 outputs the actuator driving signal to vibration actuator 10 through actuator driver 160 so as to supply the driving current for the driving, and vibrates operated part 501 so as to feed back the tactile sensation to the user. When vibrating operated part 501 with vibration actuator 10, microcomputer 150 stops the load detection.

The stop of the load detection for vibrating operated part 501 and vibration actuator 10 need to reflect the result of the load detection when microcomputer 150 controls the vibration drive of vibration actuator 10. For example, not performing the load detection itself during the generation of the vibration is a mode of the stop of the load detection, and ignorance of the detected load even after the load detection is also a mode of the stop of the load detection.

Actuator driver 160 receiving the signal from microcomputer 150 outputs the actuator driving signal to vibration actuator 10, and supplies the driving current to actuator 10. Upon reception of the driving current, vibration actuator 10 vibrates operated part 501 by transmitting the vibration.

In this manner, the vibration corresponding to the contact position at operated part 501 and the load on operated part 501 is output such that touch panel 5, i.e., operated part 501, is vibrated so as to provide a tactile sensation. Note that when the actuator driving signal is input, vibration actuator 10 moves movable member 40 in one direction to the plus X direction side, i.e., along the operation surface of touch panel 5 with a magnetic attractive force against the biasing force. By repeating this operation, vibration actuator 10 is vibrated.

Operation of Tactile Feedback Apparatus

Figure 19:
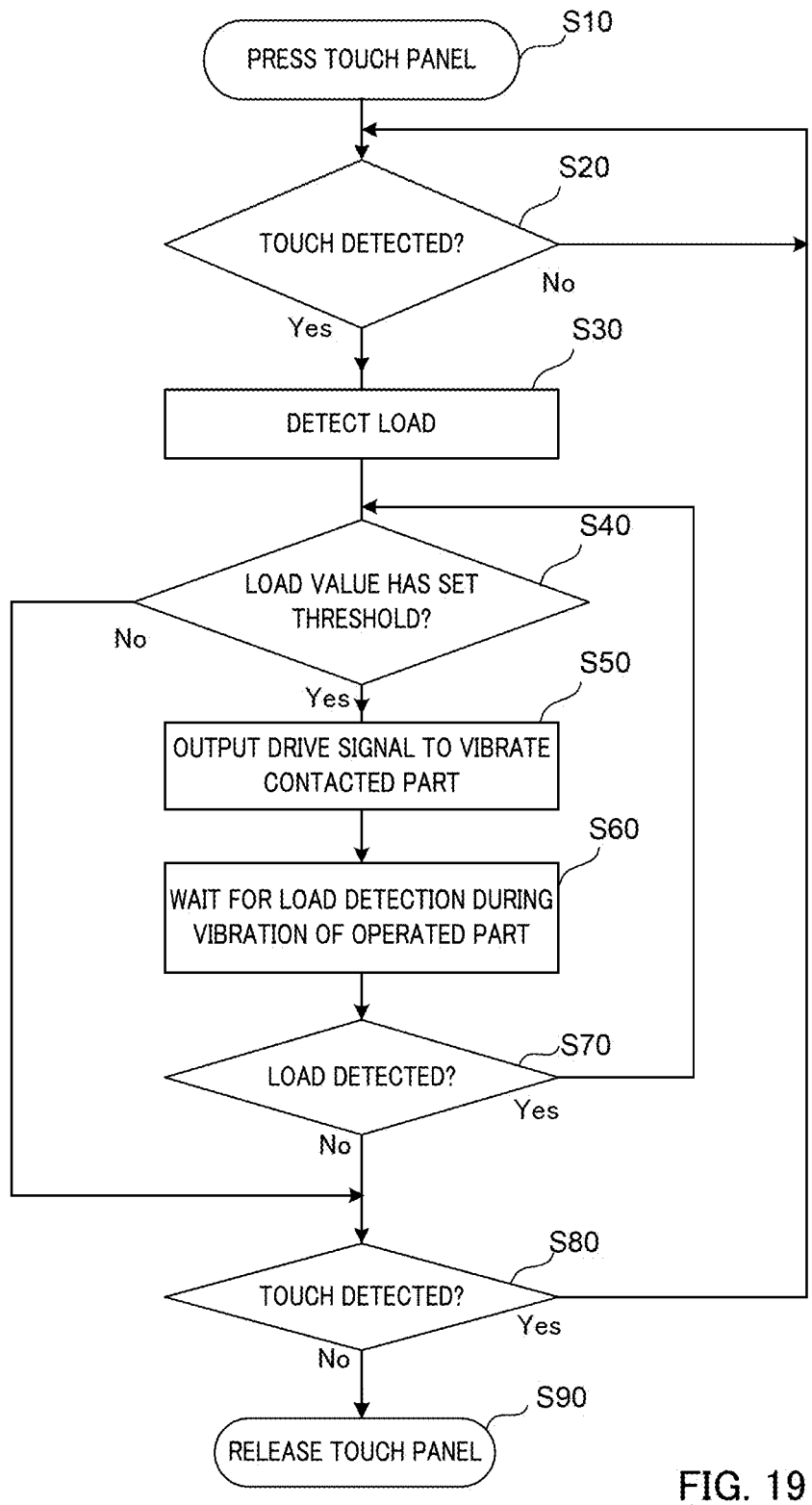
FIG. 19 is a flowchart illustrating an operation of pressing an operated part in the tactile feedback apparatus according to the present embodiment.

FIG. 19 is a flowchart illustrating an operation upon pressing an operated part in a tactile feedback apparatus.

First, at step S10, the user touches and presses the front surface of touch panel 5 (operated part 501) serving as the tactile feel presentation part.

At step S20, the contact detection part, e.g., microcomputer 150 determines whether there is a signal representing the contact detected by electrostatic sensor 6. When a contact is detected, it is determined that it is in operation, and the process is advanced to step S30.

At step S30, the load detection part performs a process of detecting the load on the operated part due to the contact operation performed on operated part 501. More specifically, by using deformation sensors 70a to 70d, it detects the load on touch panel 5 pressed by the user, and the process is advanced to step S40.

At step S40, it is determined whether the load value representing the detected load has reached a threshold value set for determining a load exerted through the press contact. When the detected load value has reached the set threshold value, the process is advanced to step S50, and the drive control part vibrates operated part 501. More specifically, microcomputer 150 outputs the actuator driving signal to coil 22 of vibration actuator 10 through actuator driver 160, and vibrates vibration actuator 10. In this manner, operated part 501 of touch panel 5 connected to movable member 40 of vibration actuator 10 is vibrated. At step S40, when the detected load value has not reached the set threshold value, the process is advanced to step S80.

Next, at step S60, the load detection part waits for the load detection process during the vibration of operated part 501. That is, microcomputer 150 stops the load detection during the vibration of vibration actuator 10. Preferably, this standby period is a period in which the vibration of vibration actuator 10, i.e., operated part 501, attenuates. The control driving part supplies the vibration pulse to vibration actuator 10, and touch panel 5, i.e., operated part 501, vibrates with that pulse. The standby period is a period until that vibration is attenuated. In the case where the attenuation period is adjusted with the supply of the succeeding pulse, the standby period is a period corresponding to the adjustment.

At step S70, it is determined whether the load detection part has detected a load. When a load has not been detected, the process is advanced to step S80. When a load has been detected, the process is returned to step S40, and the process is repeated. At step S80, the contact detection part determines whether there is a contact operation of the user on operated part 501. At step S80, when there is a contact on operated part 501, the process is advanced to step S20 and the process is repeated. At step S80, when there is no contact on operated part 501, the process is advanced to step S90, and a typical process for the case where operated part 501 in touch panel 5 is contacted is completed, and then, touch panel 5 is released.

Figure 20:
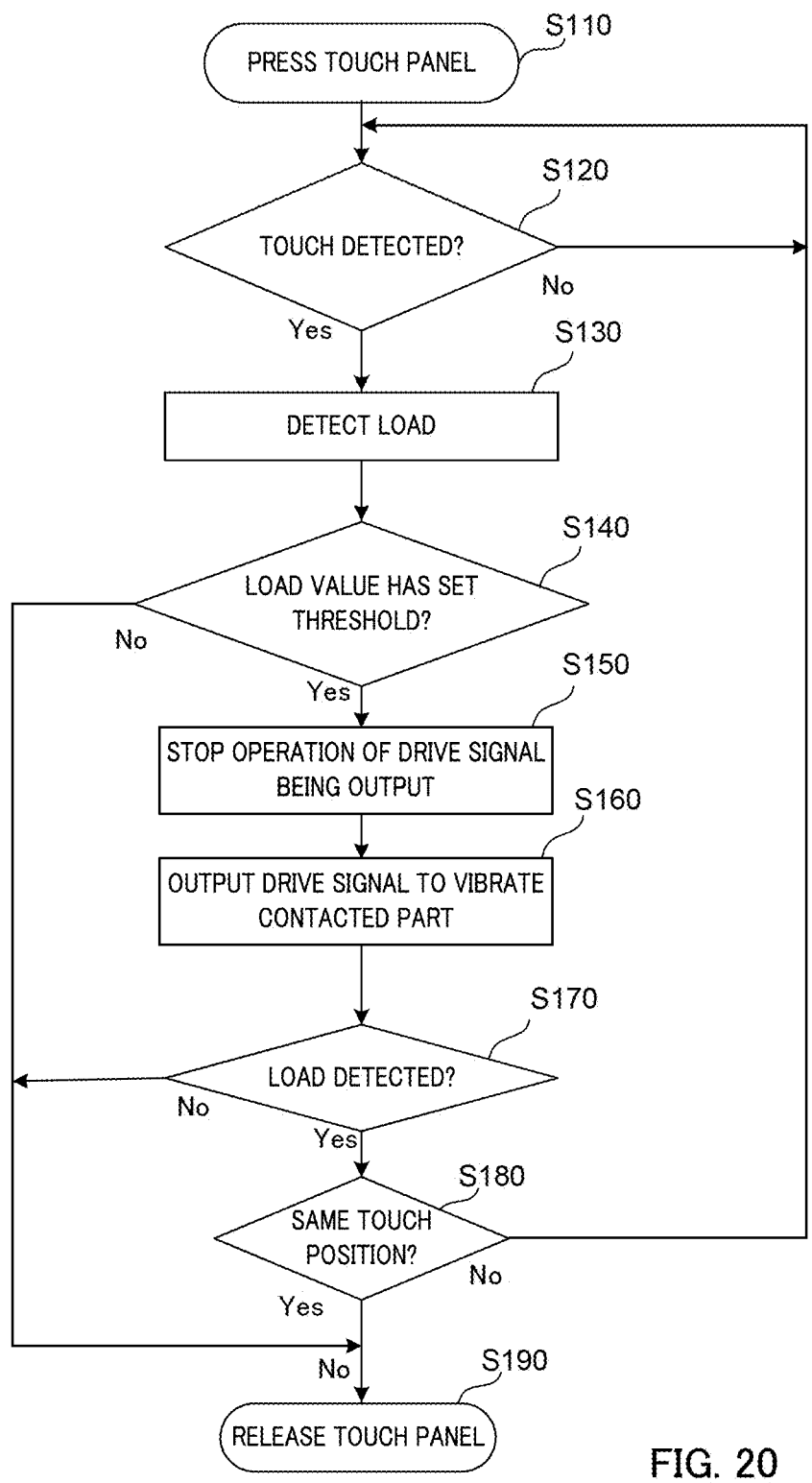
FIG. 20 is a flowchart illustrating a process of swiping the operated part in the tactile feedback apparatus according to the present embodiment.

FIG. 20 is a flowchart illustrating a process of a case of swiping an operated part in a tactile feedback apparatus.

First, at step S110, the user touches and presses the front surface of touch panel 5 (operated part 501) serving as the tactile feel presentation part.

At step S120, the contact detection part, e.g., microcomputer 150, determines whether there is a signal representing a contact detected by electrostatic sensor 6. When a contact is detected, it is determined that it is in operation, and the process is advanced to step S130.

At step S130, the load detection part detects the load applied to operated part 501 due to a contact operation performed on operated part 501. More specifically, by using deformation sensors 70a to 70d, the load on touch panel 5 pressed by the user is detected, and the process is advanced to step S140.

At step S140, the load detection part determines whether the load value representing the detected load has reached a threshold value set for determining a load exerted through the contact. When the detected load value has reached the set threshold value, it is determined that a load is exerted, i.e., operated part 501 is pressed by the user operation. At step S140, when the detected load value has not reached the set threshold value, the process is advanced to step S180.

Next, the process is advanced to step S150, and the drive control part stops the output of the actuator driving signal that is being output to the vibration actuator. That is, microcomputer 150 and actuator driver 160 stop the power supply to coil 22 of vibration actuator 10, and stops the vibration of operated part 501.

Next, at step S160, the drive control part outputs a newly input actuator driving signal corresponding to the load of operated part 501 to vibration actuator 10. More specifically, microcomputer 150 outputs the actuator driving signal to coil 22 of vibration actuator 10 through actuator driver 160 so as to vibrate vibration actuator 10.

In this manner, the load detection that normally stops during the vibration of operated part 501 is compulsorily released by interruption of a post load detection process, and a new actuator driving signal is input to vibration actuator 10 so as to vibrate operated part 501 of touch panel 5.

Next, at step S170, it is determined whether the contact detection part has detected a contact to operated part 501. When a contact has been detected, the process is advanced to step S180. When no contact has been detected, touch panel 5 is released, and the process is terminated.

At step S180, the contact detection part determines whether the contact position is the same as the last contact position. When the contact position is the same, the process is advanced to step S190, touch panel 5 is released, and the process is terminated. When the contact position is not the same, the process is returned to step S120, and the process is repeated again.

According to the present embodiment, tactile feedback apparatus 1 includes operated part (the operated part of the front surface of touch panel 5) 501 that receives the contacting operation of the user, and the contact detection part (electrostatic sensor 6 and microcomputer 150) that detects contact to operated part 501. Further, tactile feedback apparatus 1 includes the load detection part (deformation sensors 70*a* to 70*d*, amplifier 130, ADC 140, and microcomputer 150) that detects the load applied to operated part 501 through the contact operation.

Further, vibration actuator 10 that generates a vibration and outputs the vibration to operated part 501 is provided. Furthermore, tactile feedback apparatus 1 includes the drive control part (microcomputer 150 and actuator driver 160) that drives vibration actuator 10 in accordance with the detection of the contact and the detection of the load to vibrate operated part 501 and feeds back the tactile sensation to the user. The load detection part stops the detection of the load during the vibration. In this manner, the contacting operation of the user can be detected without causing erroneous detection, and a stable tactile feedback can be provided.

Other Tactile Feedback Apparatus 1A

FIG. 21 is a block diagram illustrating a main configuration of a modification of the tactile feedback apparatus of the present embodiment. Tactile feedback apparatus 1A illustrated in FIG. 21 is different from tactile feedback apparatus 1 in that orientation detection part 60 is provided.

Specifically, tactile feedback apparatus 1A includes the tactile feel presentation part such as touch panel 5A including operated part 501A, vibration actuator 10, electrostatic sensor 6A provided in touch panel 5A, amplifier 130A, ADC (AD conversion part) 140A, microcomputer 150A, and actuator driver 160A.

With these components, tactile feedback apparatus 1A forms operated part 501A of touch panel 5A, the contact detection part, the load detection part and the drive control part, as with tactile feedback apparatus 1.

The components of tactile feedback apparatus 1A have the same configurations, and in turn the same functions, as the components of tactile feedback apparatus 1. Additionally, tactile feedback apparatus 1A includes orientation detection part 60 that detects the orientation of the apparatus. Specifically, the information on the orientation of the apparatus detected by orientation detection part 60 is output to microcomputer 150. Orientation detection part 60 is a gyro sensor or the like, and detects the orientation of the attached apparatus, for example.

The load detection part composed of deformation detector (deformation sensor) 70A, amplifier 130A, ADC 140A and a part of microcomputer 150 performs correction or zero reset (zero reset function) for at least one of the load sensitivity and the initial load value on the basis of the change of the orientation.

In some situation the orientation of the product including this apparatus may be changed in the environments such as the in-vehicle environment and the mounting environment in the vehicle, and the load detection orientation may also be changed. Even in this case, the precise load can be detected without changing the initial load value by performing the correction and zero reset in accordance with the orientation.

Modifications of Vibration Actuator

Figure 23:
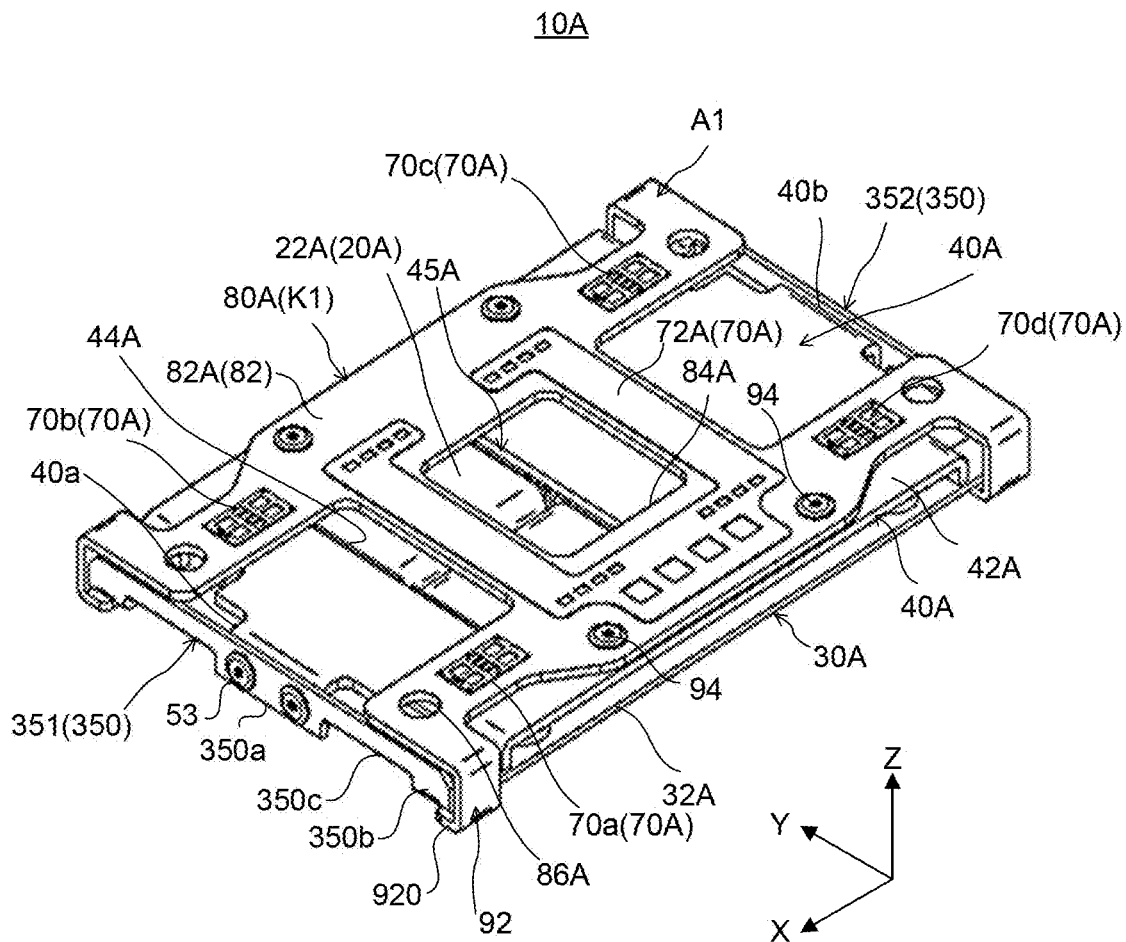
FIG. 23 is a perspective view illustrating an external appearance of a vibration actuator of Modification 1.
Figure 24:
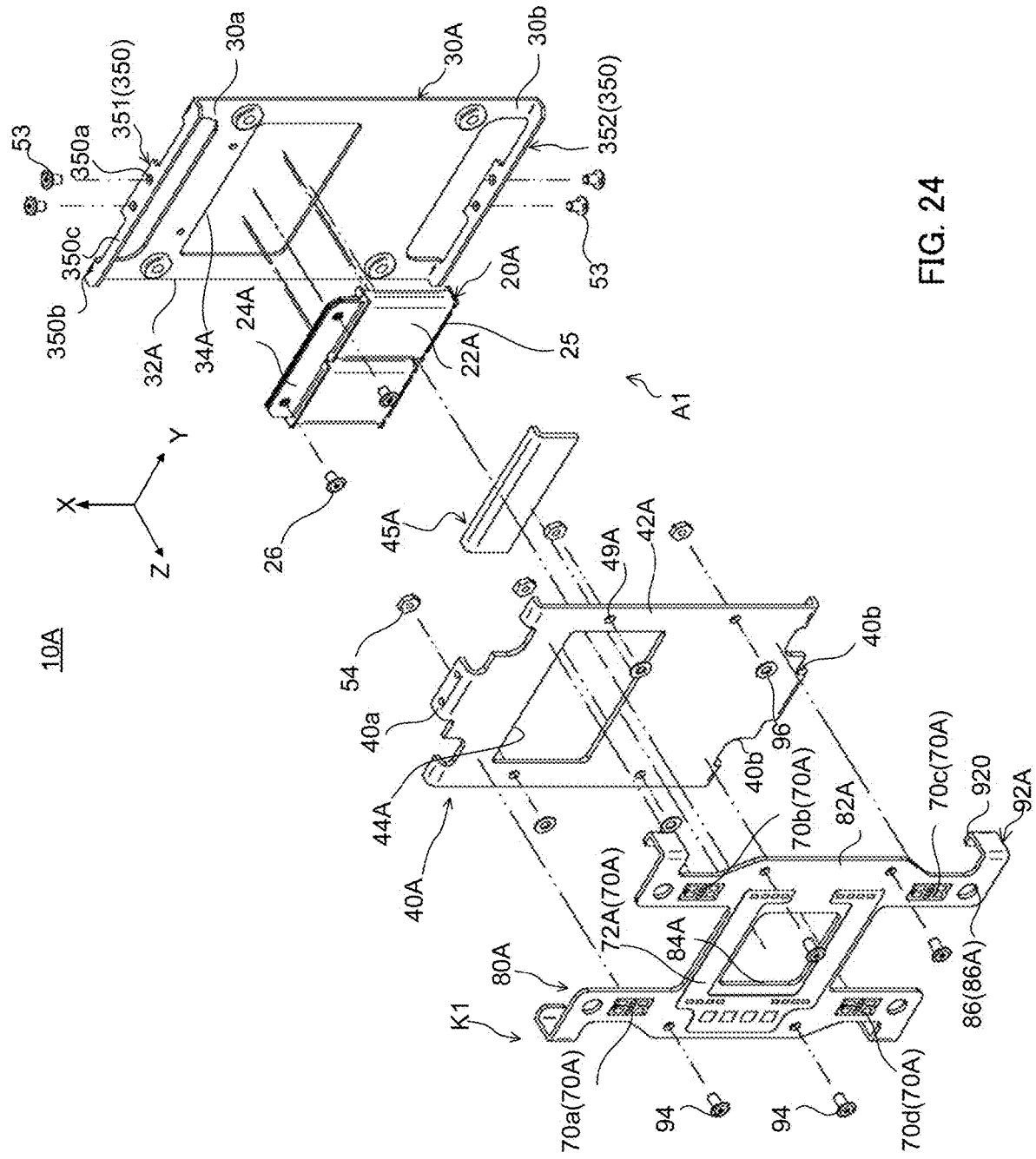
FIG. 24 is an exploded perspective view of the vibration actuator of Modification 1.
Figure 25:
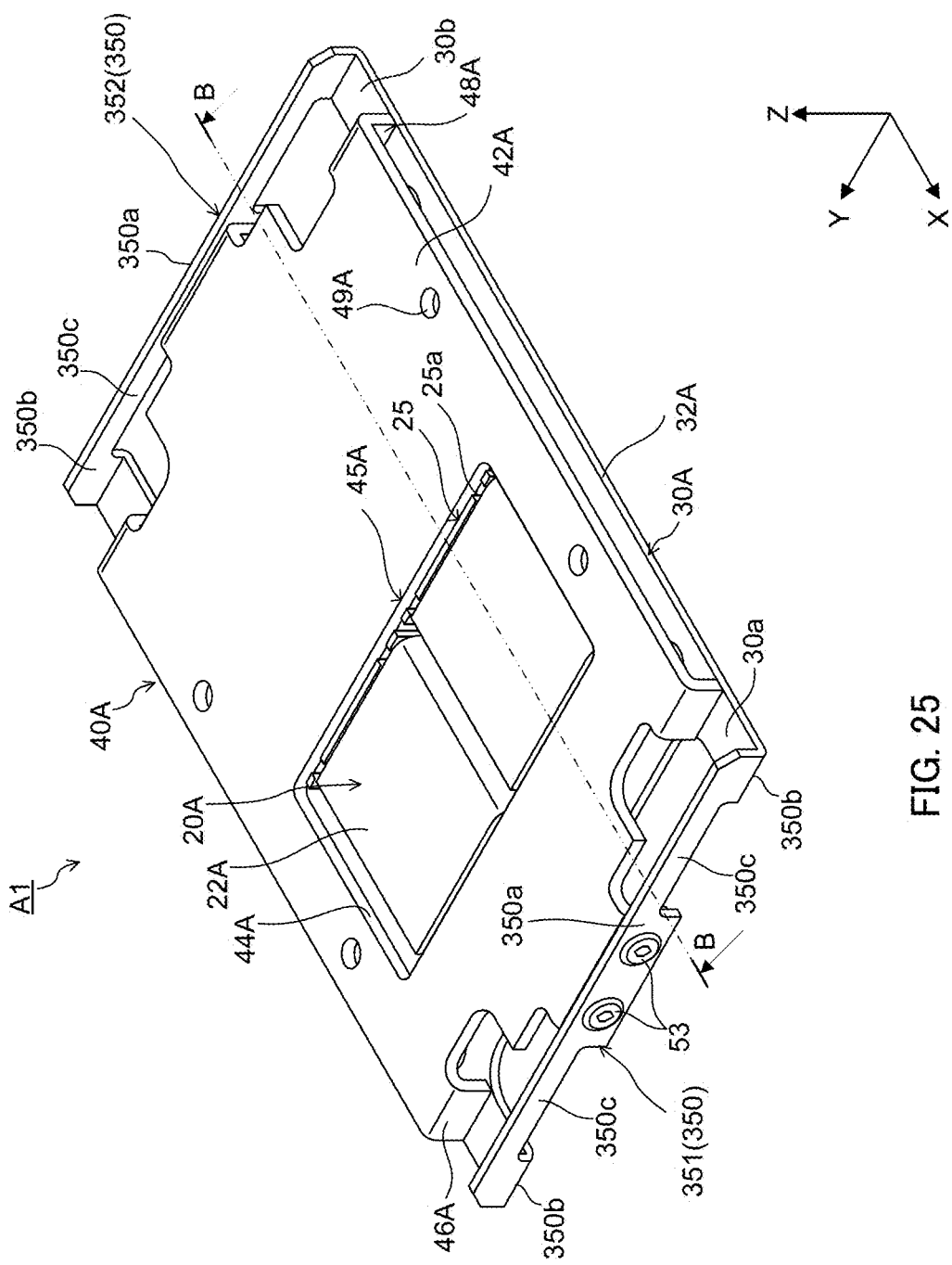
FIG. 25 is a perspective view of an actuator body illustrating a main configuration of the vibration actuator of Modification 1.
Figure 26:
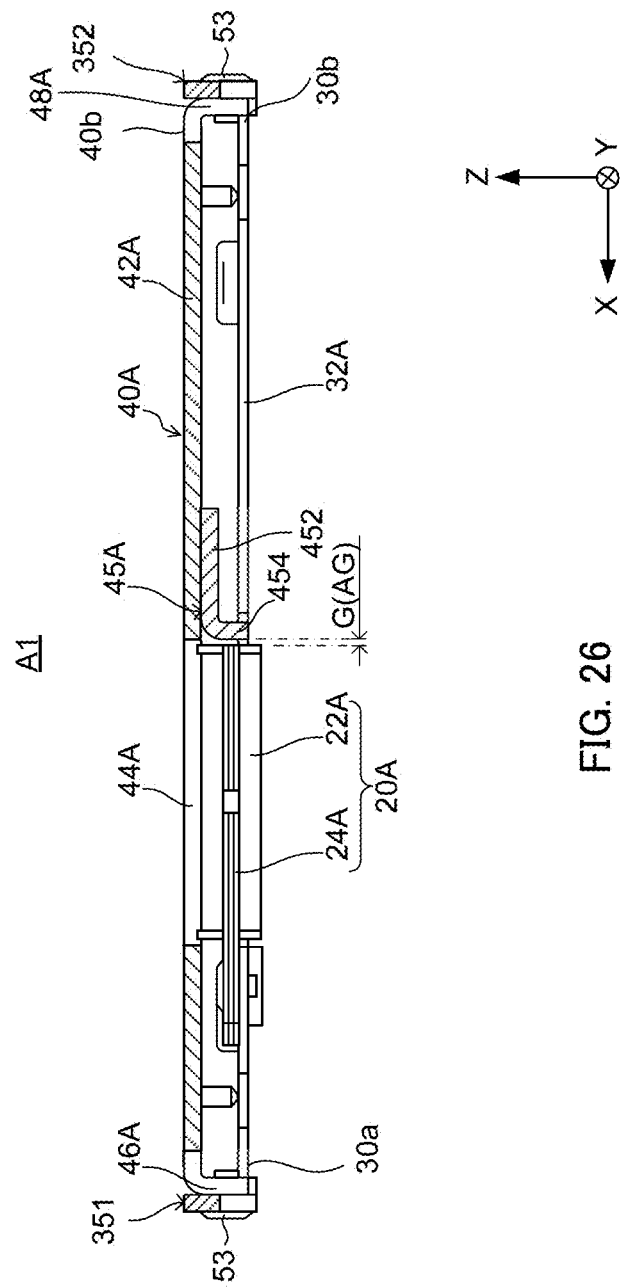
FIG. 26 is a sectional view taken along line B-B of FIG. 25.

FIG. 23 is a perspective view illustrating an external appearance of a vibration actuator of Modification 1, FIG. 24 is an exploded perspective view of the vibration actuator of Modification 1, and FIG. 25 is a perspective view of an actuator body illustrating a main configuration of the vibration actuator of Modification 1. FIG. 26 is a sectional view taken along line B-B of FIG. 25, or more specifically, a sectional view of a core assembly of an actuator body illustrating a main configuration of the vibration actuator of Modification 1.

Vibration actuator 10A of Modification 2 differs from vibration actuator 10 only in the configuration of elastic support part 350 and the configuration of attraction part 45A, while other configurations are the same. Therefore, the same configurations are denoted with the reference symbol A attached to the reference symbols of vibration actuator 10, and the description thereof is omitted with the same drawings.

Vibration actuator 10A differs in that the elastic support part is integrally provided on the fixing body 30 side, or more specifically, base part 32A and elastic support part 350 are integrated with each other and attraction part 45A is disposed separately from movable member body 42A in the configuration of vibration actuator 10.

That is, actuator body A1 functions as a thin plate-shaped actuator with the same basic configuration as that of actuator body A.

Vibration actuator 10A includes actuator body A1 and load detection module K1. As with load detection module K, load detection module K1 includes deformation member 80A partially provided in movable member 40A, and deformation detector 70A provided in deformation member 80A. Note that the fixation of movable member 40A and deformation member 80A in the present embodiment are achieved with stopper pin 94 and nut 54. Deformation member 80A generates a deformation between movable member body 42A and presentation part connecting part 86A, and this deformation is detected by deformation detector 70A.

As illustrated in FIGS. 23 to 26, vibration actuator 10A includes base part 32A, fixing body 30A including core assembly 20A, presentation part connecting part 86A connected to tactile feel presentation part, and movable member 40A including attraction part 45A composed of a magnetic material. As with core assembly 20, core assembly 20A is composed of coil 22A and core 24A on which coil 22A is wound. In this case, coil 22A is wound around bobbin 25, and it is inserted outside core 24A (as with core 24) through bobbin 25.

Movable member 40A supported in a movable manner in the vibration direction (the X direction) on base part 32A with respect to base part 32A through elastic support part 350 (351, 352). Elastic support parts 351 and 352 are integrally provided in a contiguous manner at the tip end portion 30a and base bottom end portion 30b of base part 32A. Since elastic support parts 351 and 352 are provided integrally with base part 32, the assemblability, assembly accuracy, and cost reduction in the assembling of the elastic support part, i.e., the spring assembling can be achieved.

Elastic support part 351 is provided across both end portions of tip end portion 30a in the width direction (the Y direction) at tip end portion 30a of rectangular base part 32A. Elastic support part 352 is provided across both end portions of base bottom end portion 30b in the width direction (the Y direction) at base bottom end portion 30b of rectangular base part 32A. Elastic support parts 351 and 352 are formed by bending upright base tip end portion 30a and base bottom end portion 30b separated in the longitudinal direction in the rectangular sheet metal serving as base part 32A.

Elastic deformation parts 350c are provided between both end portions 350b of elastic support parts 351 and 352 with movable member side connecting part 350a at the center. Elastic support parts 351 and 352 deflect in the sheet thickness direction i.e., the front-rear direction. Movable member side connecting part 350a is fixed to tip end portion 40a and bottom end portion 40b of movable member body 42A with securing member 53 such as a screw. In this manner, elastic support parts 351 and 352 are fixed to movable member 40A at the center portion (tip end portion 40a and bottom end portion 40b) in the width direction (the Y direction) orthogonal to the vibration direction (the X direction) at the front rear end portion of movable member 40A.

The fixing position on movable member 40A side at elastic support parts 351 and 352 is the center portion of movable member 40A in the width direction (the Y direction). In this manner, the movement of movable member 40A in the vibration direction (the X direction and the direction orthogonal to the Y direction) is restricted at the center. In this manner, highly linear drive in the X direction can be easily achieved, and movable member 40A is held at the center. Thus, a robust structure that is less twisted can be achieved and the reliability can be increased. In addition, elastic support parts 351 and 352 are fixed to fixing body 30A, or more specifically base part 32A, at both end portions in the width direction (the Y direction). Since they are fixed at the both end portions, movable member 40A is easily stably fixed, and the degrees of freedom in design can be increased when increasing the spring constant.

In movable member body 42A, opening 44A where coil 22 of core assembly 20A is disposed is formed. In addition, on the end side and base end side including tip end portion and bottom end portion 40b, leg parts 46A and 48A are formed with the end portion bent downward. Leg parts 46A and 48A ensure the distance between base part 32A and movable member body 42A. In this manner, the height position of movable member body 42A of movable member 40A with respect to base part 32A of fixing body 30A is defined.

In the present embodiment, attraction part 45A is a member separated from movable member body 42A. Attraction part 45A includes fixation plate part 452 fixed to movable member body 42A, and planar part 454 corresponding to a planar member disposed to face magnetic poles 201a and 201b of core assembly 20A.

Attraction part 45A is composed of a magnetic material, and, in the present embodiment, formed of a metal plate bent in an L-shape. Planar part 454 is provided to extend downward from fixation plate part 452. With fixation plate part 452 attached to the bottom surface near opening 44A of movable member body 42A, planar part 454 is provided to movable member body 42A in a state of extending downward from a portion of opening 44A.

Since attraction part 45A is a member separated from movable member body 42A, the size of the area opposite to magnetic poles 201a and 201b can be readily changed in accordance with the shape of core assembly 20A or the desired output amount.

Core 24 of magnetic attractive force generation part is disposed near magnetic poles 201a and 201b with air gap AG therebetween in the vibration direction along base part 32A such that the magnetic attractive force generation part (specifically magnetic poles 201a and 201b) generates an attracting force.

Deformation member 80A has the same basic configuration as that of deformation member 80, and fixed to movable member body 42A. Deformation member 80A includes stopper part 92A in addition to the basic configuration.

Stopper part 92A extends around from the front surface of deformation member 80A making up the front surface of vibration actuator 10A to the rear surface of base part 32A surrounding the side surface and making up the rear surface of vibration actuator 10A.

The portion disposed on the rear surface side of base part 32A at stopper part 92A is stopper part 920. Stopper part 920 is disposed to face the body part of deformation member 80A with a predetermined distance therebetween, and sandwiches fixing body 30A, i.e., base part 32A in the thickness direction (the Z direction) together with the body part of deformation member 80A.

In this manner, stopper part 920 functions as a stopper for restricting the movement of movable member body 42A of movable member 40A in the thickness direction with respect to base part 32A of fixing body 30A. In this manner, even in the case where there is an impact at vibration actuator 10A, damages can be prevented and the reliability can be improved.

In addition, at vibration actuator 10A, elastic support part 350 is disposed in the direction orthogonal to the vibration direction, and connected to base part 32A at the fixing part side fixing part of both end portions 350b, and, joined to movable member body 42A at the center movable member side connecting part 350a.

As described above, at tip end portion 40a and bottom end portion 40b of movable member 40, elastic support part 350 is fixed to fixing body 30A at both end portions (fixing part side fixing part) 350b in the direction orthogonal to both the vibration direction and the thickness direction so as to support movable member body 42A at movable member side connecting part 350a at the center.

Thus, since elastic deformation part 350c can be changed as necessary by changing fixing body 30A of elastic support part 350 and the fixation region of movable member 40A, movable member 40A is easily stably fixed, and the degrees of freedom in design of can be increased when increasing the spring constant even in the case where. Specifically, when used as a tactile feedback apparatus with the frequency excellent for human tactile sensation and the resonance frequency set close to each other, the spring constant can be adjusted in a wide adjustment range and the resonance frequency can be set in accordance with the mass of the movable member even in the case where a stronger vibration is provided.

In addition, since elastic support part 350 is integrated with base part 32A, the assemblability, assembly accuracy, and cost reduction of actuator body A1 and vibration actuator 10A can be achieved.

In addition, at elastic support part 350, the fixing position on movable member 40A side is at the center portion at tip end portion 40a and bottom end portion 40b of movable member 40, and therefore the movement of movable member 40A is restricted at the fixed center portion.

That is, since the movement is restricted at the center portion of the direction orthogonal to the vibration direction and the thickness direction (the Y direction), highly linear drive of movable member 40A can be easily achieved, and movable member 40A is held at the center. Thus, a robust structure that is less twisted can be achieved and the reliability can be increased. In this manner, the rigidity in the twist direction is not reduced, and the impact resistance and the vibration resistance are not affected. By achieving the highly linear vibration, ease of design of the gap within the movable range of the peripheral components of movable member 40A is increased.

Modification 2

Figure 27:
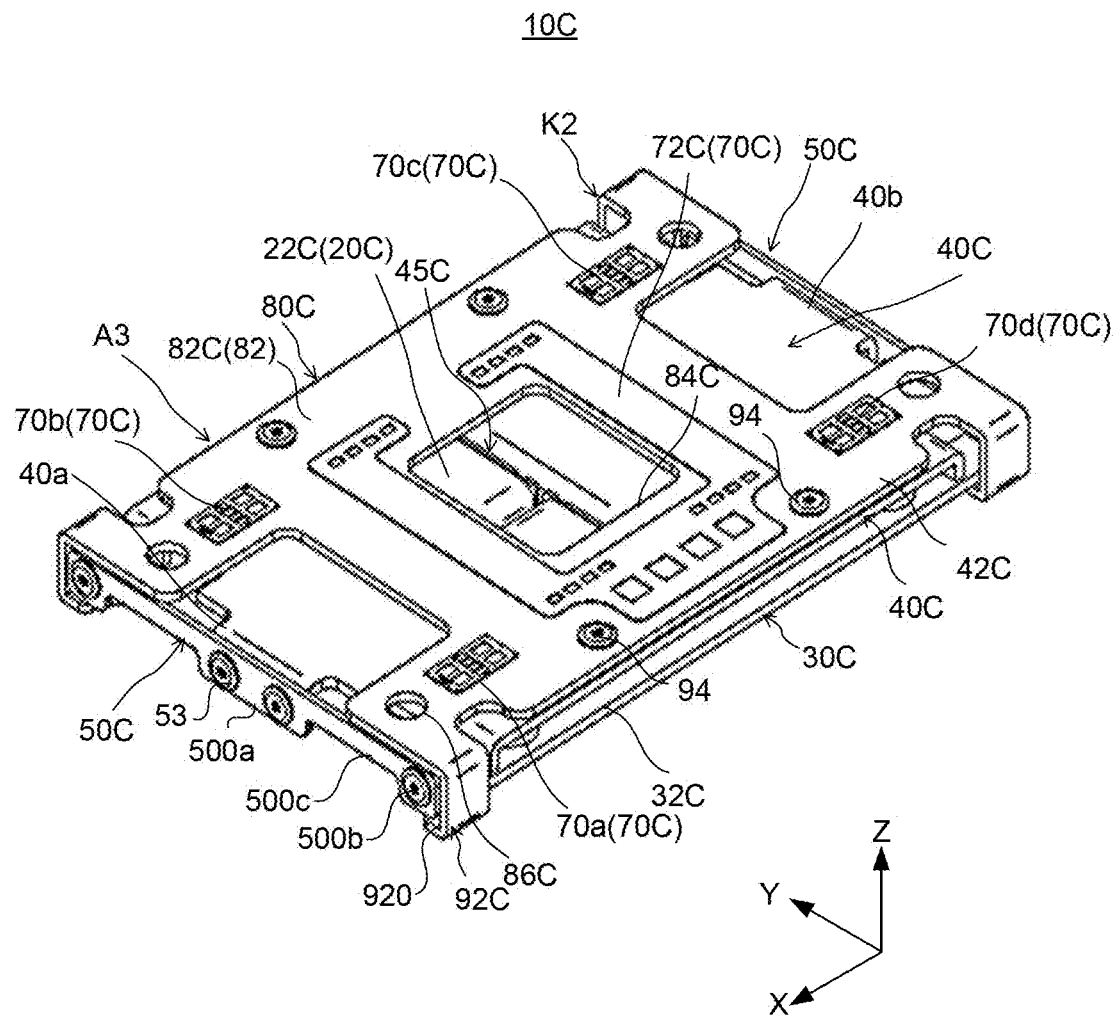
FIG. 27 is a perspective view illustrating an external appearance of a vibration actuator of Modification 2.

FIG. 27 is a perspective view illustrating an external appearance of vibration actuator 10C of Modification 2.

Vibration actuator 10C differs from vibration actuator 10 (see FIG. 4) in stopper part 920 provided in deformation member 80C and the shape of elastic support part 50C. In addition, in comparison with vibration actuator 10A (see FIG. 23), vibration actuator 10C differs in the configuration of attraction part 45C and the configuration of elastic support part 50C, while other basic configurations are the same. Therefore, only differences are described below. The same configurations are denoted with the same names and reference symbols with C, and the description will be omitted as necessary.

Vibration actuator 10C includes actuator body A3 and load detection module K2. Load detection module K2 includes deformation member 80C and deformation detector 70C provided in deformation member 80C, and has the same function as that of load detection modules K and K1. In the present embodiment, it is the same as that of load detection module K.

Actuator body A3 includes fixing body 30C including base part 32C and core assembly 20C, the connection hole (omitted in the drawing) functioning as a presentation part connecting part and firmly fixed to stopper pin 94, movable member 40C attraction part 45C composed of a magnetic material, and elastic support part 50C. The magnetic attractive force generation part (magnetic poles 201a and 201b) of core assembly 20C and attraction part 45C of movable member 40C are disposed close to each other with air gap AG therebetween in the vibration direction such that the magnetic attractive force generation part generates an attracting force.

Elastic support part 50C, which is configured separately from fixing body 30C and movable member 40C and interposed between fixing body 30C and movable member 40C in an elastically-deformable manner, elastically supports movable member 40C such that movable member 40C is movable in the vibration direction with respect to fixing body 30C.

Base part 32C has a shape with which elastic support part 350 is detachable in the structure of base part 32A (see FIG. 24).

Elastic support part 50C is disposed in an orientation in the short direction, i.e., the Y direction at the side surface of vibration actuator 10C. Elastic support part 50C is formed in a slender belt-shape provided between bent pieces separated in the short direction at base tip end portion 30a and base bottom end portion 30b of vibration actuator 10C.

Elastic support part 50C includes fixing body side end portion 500b provided at both end portions, movable member side end portion 500a provided at the center portion, and elastic deformation part 500c provided between fixing body side end portion 500b and movable member side end portion 500a.

Fixing body side end portion 500b is fixed to the bent pieces of base tip end portion 30a and base bottom end portion 30b of base part 32C. Movable member side end portion 500a is fixed to tip end portion 40a and bottom end portion 40b of movable member body 42C. Elastic deformation part 500c is disposed in the direction orthogonal to the vibration direction, and deformed in the sheet thickness direction (the X direction as the vibration direction) of elastic deformation part 500c so as to displace fixing body side end portion 500b and movable member side end portion 500a in the thickness direction of elastic deformation part 500c.

Modification 3

Figure 28:
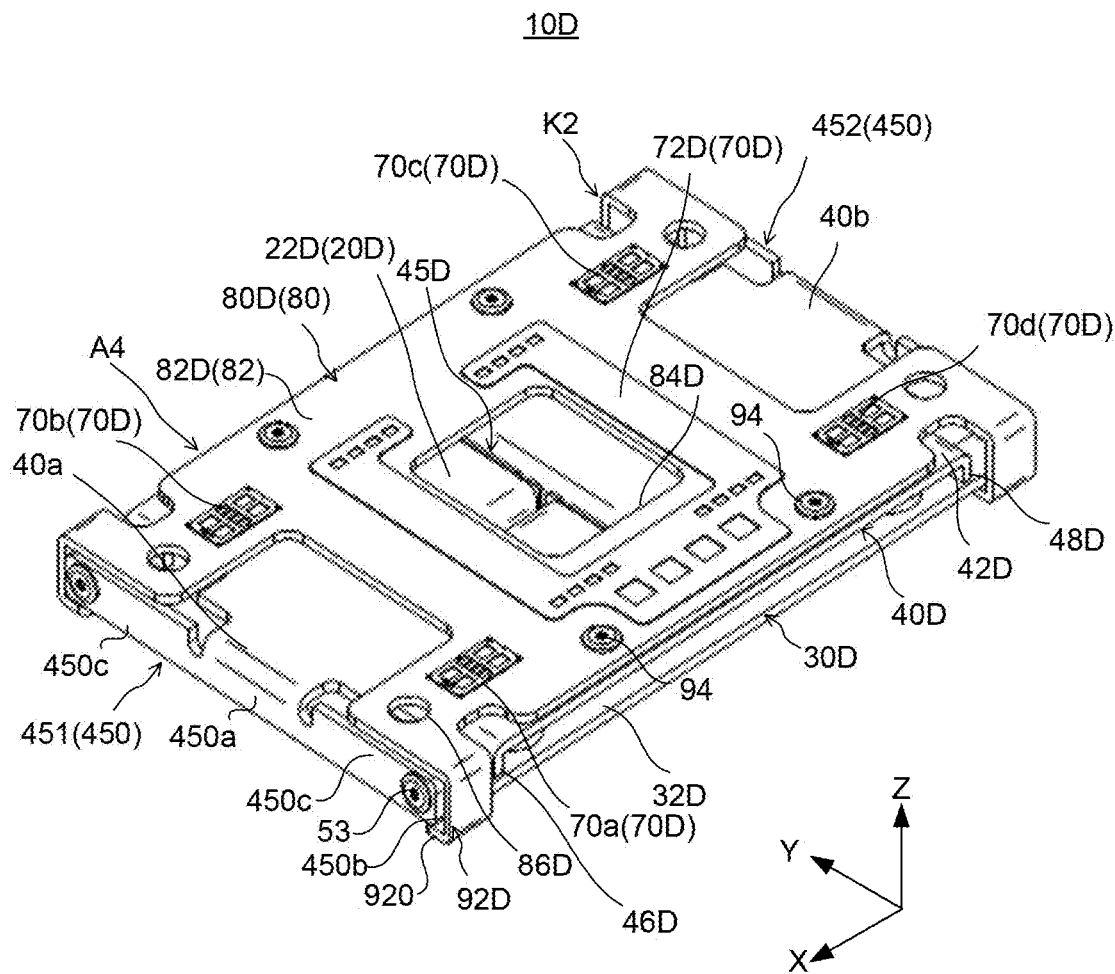
FIG. 28 is a perspective view illustrating an external appearance of a vibration actuator of Modification 3.

FIG. 28 is a perspective view illustrating an external appearance of vibration actuator of Modification 3.

In comparison with the basic configuration of vibration actuators 10A and 10C, vibration actuator 10D mainly differs in that elastic support part 450 is provided on movable member 40D side.

Vibration actuator 10D includes actuator body A4 and load detection module K2. In actuator body A4, fixing body 30D includes base part 32D and core assembly 20D. Note that the basic configuration and the function of fixing body 30D are substantially the same as those of vibration actuators 10, 10A, 10C and 10D of other embodiments.

For example, base part 32D is the same as base part 32C. Base part 32D is formed in a rectangular plate-shape with an opening where coil 22 of core assembly 20D is disposed. Bent pieces joined to elastic support part 450 are provided at base tip end portion 30a and base bottom end portion 30b of base part 32D. In addition, as with core assemblies 20A and 20C, core assembly 20D is configured such that bobbin 25 on which coil 22D is wound is inserted outside the core (omitted in the drawing) in the state where coil 22D is wound on the core (omitted in the drawing).

Conversely, in movable member 40D, movable member body 42D includes elastic support part 450 formed therein in addition to attraction part 45D composed of a magnetic material. Note that movable member body 42D is provided with the connecting part which is connected to load detection module K2 with presentation part connecting part 86D as a part of movable member 40D and to which stopper pin 94 is secured, and leg parts 46D and 48D extending downward from the body part of movable member body 42D.

Movable member 40D is movable back and forth in one direction (the X direction) orthogonal to the thickness direction with respect to fixing body 30D.

Note that in rectangular plate-shaped movable member body 42D, the opening is formed on the tip end portion 40a side, and elastic support part 450 (451 and fixation plate part 452) is formed at tip end portion 40a and bottom end portion 40b.

Elastic support part 450 is provided to extend downward from tip end portion 40*a* and bottom end portion 40*b* of the body part of movable member body 42D, and extend in the direction (the Y direction and the width direction) orthogonal to the vibration direction (the X direction) and the thickness direction (the Z direction). Elastic support part 450 has a belt shape the height (the length in the Z direction) of which is the thickness of movable member 40D.

Elastic support part 450 includes center connecting part 450*a* connected to movable member body 42D at the center in the width direction, fixing body side fixing part 450*b* at both ends, and elastic deformation part 450*c* connecting center connecting part 450*a* and fixing body side fixing part 450*b*.

Elastic support part 450 is set in the state where movable member 40D is elastically supported with respect to base part 32D at the center portion (tip end portion 40*a* and bottom end portion 40*b*) in the width direction orthogonal to the vibration direction at both end portions on the front and rear sides. In this manner, the same operation and effect as the operation and effect of elastic support parts 351 and 352 of Modification 1 can be obtained.

The above is a description of the embodiment of the present invention. The above description is an example of a suitable embodiment of the invention, and the scope of the invention is not limited thereto. In other words, the above description of the configuration of the device and the shape of each part is an example, and it is clear that various changes and additions to these examples are possible within the scope of the invention.

This application is entitled to and claims the benefit of Japanese Patent Application No. 2020-182578 filed on Oct. 30, 2020, the disclosure each of which including the specification, drawings and abstract is incorporated herein by reference in its entirety.

INDUSTRIAL APPLICABILITY

The tactile feedback apparatus according to the present invention achieves effects with which the contacting operation of the user can be detected without causing erroneous detection, and a stable tactile feedback can be provided. For example, the tactile feedback apparatus according to the present invention is suitable for tactile feedback apparatuses such as touch display apparatuses in in-vehicle products and industrial equipment.

REFERENCE SIGNS LIST 1, 1A Tactile feedback apparatus
3 Base part
5, 5A Touch panel
6 Electrostatic sensor
501, 501A Operated part
10, 10A, 10C, 10D Vibration actuator
12 Switching element
14 Signal generation part
20, 20A, 20C, 20D Core assembly
22, 22A, 22C, 22D Coil
23 Substrate
24, 24A Core
25 Bobbin
26, 53 Securing member (Screw)
30, 30A, 30C, 30D Fixing body
30*a* Base tip end portion
30*b* Base bottom end portion
32, 32A, 32C, 32D Base part
34, 34A Opening
36 Connecting part
38 Fixation hole
40, 40A, 40C, 40D Movable member
40*a* Tip end portion
40*b* Bottom end portion
42 Movable member body
42A, 42C, 42D Movable member body
44, 44A Opening
45, 45A, 45C, 45D Attraction part
46A, 46D Leg part
48A, 48D Leg part
50, 51, 52, 350, 351, 352, 450 Elastic support part
50*a* Other end portion
50*b* One end portion
50*c* Elastic deformation part
50C Elastic support part
54 Nut
70, 70A, 70C Deformation detector
70*b*, 70*c*, 70*d* Deformation detection sensor (Deformation sensor, Load detection part)
72 Substrate
80, 80A, 80C Deformation member
82 Frame part
84 Opening
85 Connection arm part
86, 86A, 86D Presentation part connecting part
90 Movement restriction part
92 Stopper receipt portion
92*a* Insertion part
92*b* Flange part
92A, 92C, 92D Stopper part
94 Stopper pin
94*a* Flange part
94*b* Pin shaft
96 Washer
130, 130A Amplifier
140, 140A AD Conversion part
150 Microcomputer
160 Actuator driver
200 Tactile feedback apparatus
201*a*, 201*b* Magnetic pole
240, A1, A2, A3, A4 Actuator body
321 Through hole
350 Elastic support part
350*a* Movable member side connecting part
350*b* Both end portions
350*c* Elastic deformation part
450*a* Center connecting part
450*b* Fixing body side fixing part
450*c* Elastic deformation part
452 Fixation plate part
454 Planar part
500*a* Movable member side end portion
500*b* Fixing body side end portion
500*c* Elastic deformation part
501, 501A Operated part
920 Stopper part
K, K1, K2, K3, K4 Load detection module
R-A1, R-A2, R-A3, R-A4, R-B1, R-B2, R-B3, R-B4, R-C1, R-C2, R-C3, R-C4, R-D1, R-D2, R-D3, R-D4 Strain gauge part
SBD Resistance
G Gap
AG Air gap

What is claimed is:

1. A tactile feedback apparatus, comprising:
   an operated part configured to receive a user operation using a contact;
   a contact detection part configured to detect the contact on the operated part;
   a load detection part configured to detect a load of the contact on the operated part;
   a vibration actuator configured to generate a vibration and output the vibration to the operated part; and
   a drive control part configured to vibrate the operated part by driving the vibration actuator in accordance with a detection of the contact and a detection of the load, and feed back a tactile sensation to the user,
   wherein the load detection part stops the detection of the load during the vibration.

2. The tactile feedback apparatus according to claim 1, wherein the load detection part continuously stops the detection of the load until the vibration is attenuated.

3. The tactile feedback apparatus according to claim 2, wherein the load detection part continuously stops the detection of the load until the vibration is attenuated and a displacement amount of the vibration is reduced to a predetermined rate with respect to a maximum displacement amount.

4. The tactile feedback apparatus according to claim 2, wherein the load detection part continuously stops the detection of the load until a timing after the drive control part inputs a pulse with which an attenuation period of the vibration is adjustable.

5. The tactile feedback apparatus according to claim 1, wherein the drive control part performs the detection of the load that is in a stopped state when a position of the contact is changed during the vibration.

6. The tactile feedback apparatus according to claim 1, wherein the load detection part averages data representing the load, and detects the load based on averaged data.

7. The tactile feedback apparatus according to claim 1, wherein the load detection part resets an initial load value when the apparatus is activated, or each time when a certain period elapses, or, when a non-use period of the apparatus elapses for a certain period or more.

8. The tactile feedback apparatus according to claim 1, further comprising, an orientation detection part configured to detect an orientation of the apparatus, wherein
   the load detection part has a function for correction or zero reset for at least one of a load sensitivity and an initial load value on a basis of a change of the orientation.

9. The tactile feedback apparatus according to claim 1, further comprising, an attenuation part configured to attenuate a vibration of the operated part.

10. The tactile feedback apparatus according to claim 9, wherein the attenuation part is an elastomer sandwiched between the operated part and a base part to which the vibration actuator is fixed in a drivable manner.

11. The tactile feedback apparatus according to claim 9, wherein the attenuation part comprises silicone rubber or butyl rubber.

12. The tactile feedback apparatus according to claim 9, wherein the attenuation part is disposed at a plurality of positions around a symmetric center of a surface of the operated part where the user operation is received.

13. The tactile feedback apparatus according to claim 1, wherein the operated part is provided in a touch panel.

14. The tactile feedback apparatus according to claim 1, wherein the load detection part includes a deformation sensor.

15. The tactile feedback apparatus according to claim 1, wherein the load detection part is disposed between the operated part and the vibration actuator.

16. The tactile feedback apparatus according to claim 1, wherein the load detection part is provided integrally with the vibration actuator.

17. The tactile feedback apparatus according to claim 1, wherein the vibration actuator includes:
   a fixing body; and
   a movable member directly connected to the operated part and configured to vibrate with respect to the fixing body through an electromagnetic interaction.

18. The tactile feedback apparatus according to claim 1, wherein the contact detection part comprises an electrostatic sensor.

* * * * *